United States Patent
Docherty et al.

(10) Patent No.: US 9,607,384 B2
(45) Date of Patent: Mar. 28, 2017

(54) OPTIMAL PATCH RANKING FOR COORDINATE TRANSFORM ESTIMATION OF MICROSCOPE IMAGES FROM SPARSE PATCH SHIFT ESTIMATES

(71) Applicant: CANON KABUSHIKI KAISHA, Tokyo (JP)

(72) Inventors: Andrew Docherty, St Leonards (AU); James Austin Besley, Killara (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/133,161

(22) Filed: Dec. 18, 2013

(65) Prior Publication Data

US 2014/0177941 A1   Jun. 26, 2014

(30) Foreign Application Priority Data

Dec. 21, 2012   (AU) ................................ 2012268846

(51) Int. Cl.
| | | |
|---|---|---|
| *G06K 9/00* | (2006.01) | |
| *G06T 7/00* | (2017.01) | |
| *G02B 21/36* | (2006.01) | |

(52) U.S. Cl.
CPC ............ *G06T 7/003* (2013.01); *G02B 21/367* (2013.01); *G06K 9/00127* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 2006/0045388 A1* | 3/2006 | Zeineh et al. | ................ | 382/312 |
| 2006/0133657 A1* | 6/2006 | Schmid | ................ | G01N 15/042 |
| | | | | 382/128 |
| 2008/0187208 A1* | 8/2008 | Shirota | ............. | G06K 9/00134 |
| | | | | 382/133 |

(Continued)

OTHER PUBLICATIONS

Zomet, Assaf, et al. "Seamless image stitching by minimizing false edges." Image Processing, IEEE Transactions on 15.4 (2006): 969-977. 9 pages.*

(Continued)

*Primary Examiner* — Sumati Lefkowitz
*Assistant Examiner* — Ryan P Potts
(74) *Attorney, Agent, or Firm* — Canon U.S.A., Inc. IP Division

(57) ABSTRACT

A method of determining a coordinate transform between a first image and a second image, said method comprising the steps of: determining a rate of change of pixel values for locations on the first image to identify candidate alignment patches in the first image; specifying subsets of patches from the set of candidate alignment patches based on an error metric, selecting a subset of candidate alignment patches from said plurality of subsets of candidate alignment patches based upon a predetermined criterion; estimating, for each patch in the selected subset, a shift between the patch and a corresponding patch in the second image, the location of the corresponding patch in the second image being determined from the location of the patch in the first image; and determining the coordinate transform between the first image and second image based on the estimated shifts.

14 Claims, 17 Drawing Sheets

(56) References Cited

U.S. PATENT DOCUMENTS

2009/0148051 A1* 6/2009 Pham et al. ............... 382/219
2011/0007138 A1* 1/2011 Zhang .................. G06T 17/00
                                                                                              348/50

OTHER PUBLICATIONS

Frank Dellaert, Robert Collins, Fast Image-Based Tracking by Selective Pixel Integration, pp. 1-21, 1999.

* cited by examiner

OPTIMAL PATCH RANKING FOR COORDINATE TRANSFORM ESTIMATION OF MICROSCOPE IMAGES FROM SPARSE PATCH SHIFT ESTIMATES

REFERENCE TO RELATED PATENT APPLICATION(S)

This application claims the benefit under 35 U.S.C. §119 of the filing date of Australian Patent Application No. 2012268846, filed 21 Dec. 2012, hereby incorporated by reference in its entirety as if fully set forth herein.

TECHNICAL FIELD

The current invention relates to digital image processing and, in particular, to a microscope system where multiple views of a specimen are taken and the deformation between two images of the same specimen location is determined. The present invention also relates to a method and apparatus for determining deformation, and to a computer program product including a computer readable medium having recorded thereon a computer program for determining deformation.

BACKGROUND

Virtual microscopy is a technology that gives physicians the ability to navigate and observe a biological specimen at different simulated magnifications and through different 3D views as though they were controlling a microscope. This can be achieved using a display device such as a computer monitor or tablet with access to a database of microscope images of the specimen. There are a number of advantages of virtual microscopy over traditional microscopy: the specimen itself is not required at the time of viewing, thus facilitating archiving, telemedicine and education. Virtual microscopy can also enable the processing of the specimen images to change the depth of field and to reveal pathological features that would be otherwise difficult to observe by eye, for example as part of a computer aided diagnosis system.

Capture of images for virtual microscopy is generally performed using a high throughput slide scanner. The specimen is loaded mechanically onto a stage and moved under the microscope objective so that images of different parts of the specimen can be captured by a sensor. Adjacent images typically have an overlap region so that the multiple images of the same specimen can be combined into a 3D volume in a computer system attached to the microscope. If the specimen movement could be controlled accurately enough these images could be combined directly to give a seamless 3D view without any defects. Typically however this is not the case and the specimen movement introduces errors in position and rotation of the neighbouring images. In this case software algorithms are required to register both the neighbouring images at the same depth and at different depths to reduce defects and distortion between adjoining images.

Microscopy is different from other mosaicking tasks in a number of important ways. Firstly, the specimen is typically moved by the stage under the optics, rather than the optics being moved to capture different parts of the subject as would take place in a panorama capture arrangement. The stage movement can be controlled very accurately and the specimen may be fixed in a substrate. Also, the microscope is used in a controlled environment—for example mounted on a vibration isolation platform in a laboratory with a custom illumination setup so that the optical tolerances of the system (alignment and orientation of optical components and the stage) are very tight. Therefore, coarse alignment of the captured tiles for mosaicking is fairly accurate, the lighting even, and the transform between the tiles typically well represented by an affine transform—which includes the geometric operations of scaling, rotations, translations, and shear. On the other hand, the scale of certain important features of a specimen can be of the order of several pixels and the features can be densely arranged over the captured tile images. This means that the required stitching accuracy for virtual microscopy is very high. Additionally, given that the microscope can be loaded automatically and operated in batch mode, the processing requirements are also high.

The image registration process compares the pixels in the overlapping regions of two neighbouring images to determine the relative deformations in the images. In some systems all pixels in the overlapping regions in both images are used to calculate this deformation. However, the speed of the process can be significantly improved by only taking measurements at small image patches within the overlap regions. These patch-based techniques can be an order of magnitude faster and when the distortions present in the image are small—as is often the case in a microscope—they can be highly accurate.

An important problem when using patch-based techniques is where to locate the small patches. Locating patches in areas that contain a lot of texture is important to obtain an accurate estimate of the shift between corresponding patches in different images. There are several techniques to analyse the texture content of a patch and whether this texture is either 1D or 2D. However, it is not only important to place patches at locations with texture but in addition it is important to space them well throughout the image.

An existing technique used to choose well distributed patches is to select locations where the texture is a maximum within a disk of a fixed radius centered at that location. The problem with this technique is that the number of points that it selects depends upon the image content. An improvement to this technique has been introduced that effectively varies the radius of the disk to give a fixed number of points in all images. However, this technique is significantly slower than using a fixed radius. Other techniques have been proposed to improve the speed of the variable radius technique by comparing to an approximate radius which can be done much faster. These techniques give priority to locations that are local maxima of texture over a larger radius, and do not distinguish between low texture points versus high texture points with similar but unequal radii.

Alternative techniques that have been proposed include segmenting the image into a fixed grid of cells and choosing a fixed number of high texture locations from each cell. This does not work well if image features are localized to a small number of cells, and if many cells are blank this approach chooses many locations that are not useful for image registration Improvements to this technique have been proposed which adaptively subdivide the cells depending on the image content within them and which therefore choose more points where there is more texture. These techniques nonetheless are not able to reliably select patch locations that give good estimates of distortion between images when image noise produces spurious texture. Because of this a large number of patches need to be used to get a reliable estimate of the distortion. There is therefore a need for a method of selecting patch locations that overcomes the limitations of prior-art approaches.

SUMMARY

It is an object of the present invention to substantially overcome, or at least ameliorate, one or more disadvantages of existing arrangements.

Disclosed are arrangements, referred to as Error Based Patch Selection (EBPS) arrangements, which seek to address the above problems by, noting that an estimated coordinate transform will have errors leading to non-uniform errors in pixel positions, choosing patch locations that minimize this maximum error for the specific transform to be estimated.

The EBPS arrangements determine the locations of patches throughout an image for patch-based alignment that are optimal for the estimation of a specific coordinate transform. This coordinate transform can comprise a combination of rotation, scaling, shear and translation, a full affine transform, a polynomial coordinate transform, or a projective transform.

In addition, the analysis of the patches done in the patch-selection process generates an anisotropic transform estimation weighting matrix W, given below by Equation [27], which can be used to estimate the parameters of the coordinate transform using the patches at the selected patch locations. This enables the patch-selection system to choose not only the best patch locations within an image, but in addition the best combination of 1D and 2D features within the image for the specific purpose of estimating a particular coordinate transform.

A further feature of the EBPS arrangements is the generation of a ranked list of sets of patches that contain an increasing number of patches and an associated list of the variance of the maximum pixel misregistration for each set. This list of the variances of the maximum pixel misregistration can be used to dynamically select an appropriate number of patches to use to register each image pair.

According to a first aspect of the present invention, there is provided a method for determining a coordinate transform between a first image and a second image from a selected subset of candidate alignment patches, said method comprising the steps of:

determining a rate of change of pixel values for each of a plurality of locations on the first image to identify a set of candidate alignment patches in the first image;

specifying a plurality of subsets of candidate alignment patches from the set of candidate alignment patches based on an error metric corresponding to each subset, said error metric depending upon said rate of change of pixel values for the patches in a corresponding subset;

selecting a subset of candidate alignment patches from said plurality of subsets of candidate alignment patches based upon a predetermined criterion;

estimating, for each patch in the selected subset, a shift between the patch and a corresponding patch in the second image, the location of the corresponding patch in the second image being determined from the location of the patch in the first image; and determining the coordinate transform between the first image and second image based on the estimated shifts.

According to another aspect of the present invention, there is provided a method of forming a composite image from a first image and a second image captured by a microscope, said first and second images having an area of overlap, said method comprising the steps of:

determining a rate of change of pixel values for each of a plurality of locations on the first image to identify a set of candidate alignment patches in the first image;

specifying a plurality of subsets of candidate alignment patches from the set of candidate alignment patches based on an error metric corresponding to each subset, said error metric depending upon said rate of change of pixel values for the patches in a corresponding subset;

selecting a subset of candidate alignment patches from said plurality of subsets of candidate alignment patches based upon a predetermined criterion;

estimating, for each patch in the selected subset, a shift between the patch and a corresponding patch in the second image, the location of the corresponding patch in the second image being determined from the location of the patch in the first image;

determining a coordinate transform between the first image and second image based on the estimated shifts; and combining the first image and the second image using the coordinate transform to form the single composite image According to another aspect of the present invention, there is provided an apparatus for determining a coordinate transform between a first image and a second image from a selected subset of candidate alignment patches, said apparatus comprising:

a processor; and a memory storing a computer executable software program for directing the processor to perform the steps of:

determining a rate of change of pixel values for each of a plurality of locations on the first image to identify a set of candidate alignment patches in the first image;

specifying a plurality of subsets of candidate alignment patches from the set of candidate alignment patches based on an error metric corresponding to each subset, said error metric depending upon said rate of change of pixel values for the patches in a corresponding subset;

selecting a subset of candidate alignment patches from said plurality of subsets of candidate alignment patches based upon a predetermined criterion;

estimating, for each patch in the selected subset, a shift between the patch and a corresponding patch in the second image, the location of the corresponding patch in the second image being determined from the location of the patch in the first image; and determining the coordinate transform between the first image and second image based on the estimated shifts.

According to another aspect of the present invention, there is provided a computer readable storage medium having a computer program recorded therein, the program being executable by a computer apparatus to make the computer perform a method for determining a coordinate transform between a first image and a second image from a selected subset of candidate alignment patches, said program comprising:

computer executable code for determining a rate of change of pixel values for each of a plurality of locations on the first image to identify a set of candidate alignment patches in the first image;

computer executable code for specifying a plurality of subsets of candidate alignment patches from the set of candidate alignment patches based on an error metric corresponding to each subset, said error metric depending upon said rate of change of pixel values for the patches in a corresponding subset;

computer executable code for selecting a subset of candidate alignment patches from said plurality of subsets of candidate alignment patches based upon a predetermined criterion;

computer executable code for estimating, for each patch in the selected subset, a shift between the patch and a corresponding patch in the second image, the location of the corresponding patch in the second image being determined from the location of the patch in the first image; and computer executable code for determining the coordinate transform between the first image and second image based on the estimated shifts.

Other aspects of the invention are also disclosed.

BRIEF DESCRIPTION OF THE DRAWINGS

One or more embodiments of the invention will now be described with reference to the following drawings, in which:

FIG. 13b is an illustration of the resulting error metric as calculated in step 902 of FIG. 9 for the example image of FIG. 13a; FIG. 15b is a graph showing statistical results for the accuracy of applying a standard method and the method of FIG. 4 to the test image of FIG. 15a.

DETAILED DESCRIPTION INCLUDING BEST MODE

Figure 1:
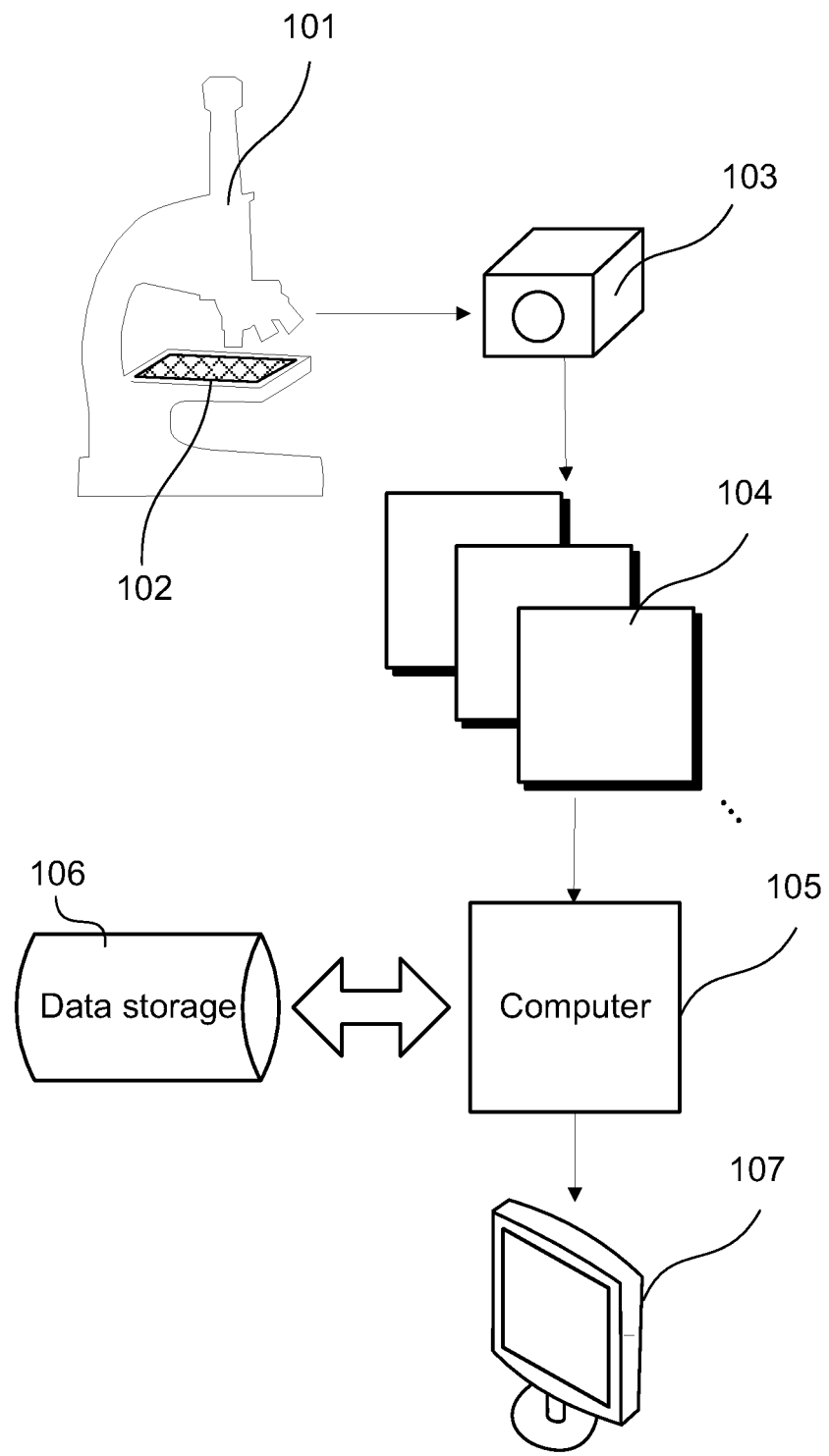
FIG. 1 is a schematic block diagram of the system showing its main functional components according to a EBPS arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

Context

Unlike previous methods the locations identified by the EBPS arrangement are not selected heuristically, such as by choosing patches locations that are well-spaced and locally maximize a texture function. Instead, the patch locations are chosen to minimize the expected variance of the maximum misregistration error for any pixel within the image.

FIG. 1 shows a high-level system diagram for a general microscope capture system. A specimen 102 is a thin semi-transparent sample to be inspected. The specimen 102 is suitably prepared and then fixed on a transparent slide and physically positioned on a movable stage that is under the lens of a microscope 101. The specimen 102 has a spatial extent larger than a field of view of the microscope 101 in any or all of the 3 directions x, y, and z. The stage of the microscope 102 moves to allow multiple and overlapping parts of the specimen 102 to be captured by a camera 103 mounted on the microscope 101. The camera 103 takes one or more images (also referred to as "tiles or "tile images") at each stage location. Multiple images can be taken with different optical settings or using different types of illumination. Captured images 104 are passed to a computer system 105 which can either start processing the images immediately or store them in temporary storage 106 for later processing. The captured images 104 are captured in an image array such that adjacent images have a small overlap region which gives different views of the same part of the specimen 102.

Figure 3A:
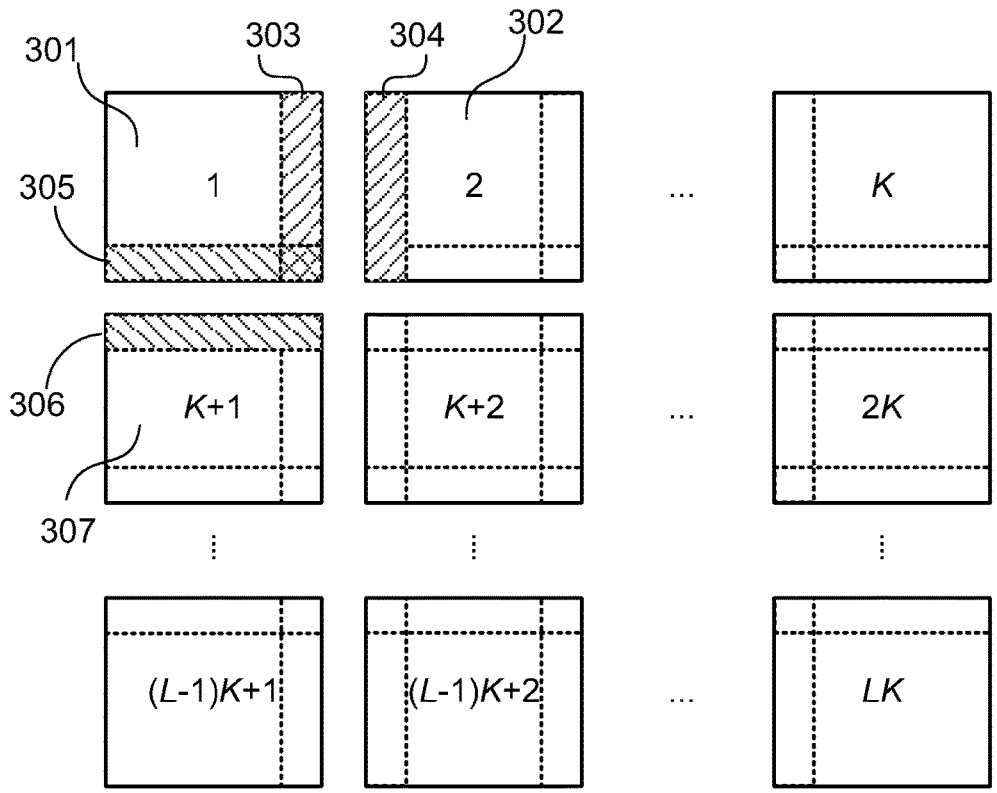
FIG. 3a is an illustration of the captured image tiles as used in the method of FIG. 2.

FIG. 3a depicts an example of images that have been captured in a 2D rectangular image array having L rows with K columns. A portion of both adjacent images in a pair of images relate to the same part of the specimen 102. For instance, for the pair of horizontally adjacent images 1 (ie 301) and 2 (ie 302), shaded regions 303 and 304 contain views of the same region of the specimen 102. Similarly, for a pair of vertically adjacent images 1 (ie 301) and K+1 (ie 307) shaded regions 305 and 306 contain views of the same region of the specimen 102. Although the true geometric relationship that maps the specimen coordinates to the pixels of the captured images 104 is not known, the tolerances of the microscope 101 are typically well characterised and the possible range of offsets and rotations between pairs of captured images can thus typically be determined.

When required, the computer 105 determines the alignment operations (ie the coordinate transforms) required to stitch all individual images together seamlessly to form a composite image forming a virtual slide in a virtual microscope system. The display system 107 then uses the images 104 and the coordinate transforms to display the whole or parts of this virtual slide. The computer can additionally process the information on the virtual slide before presentation to the user to enhance the image. This processing can take the form of changing the image appearance to give diagnostic assistance to the user, and other potential enhancements.

Figure 6A:
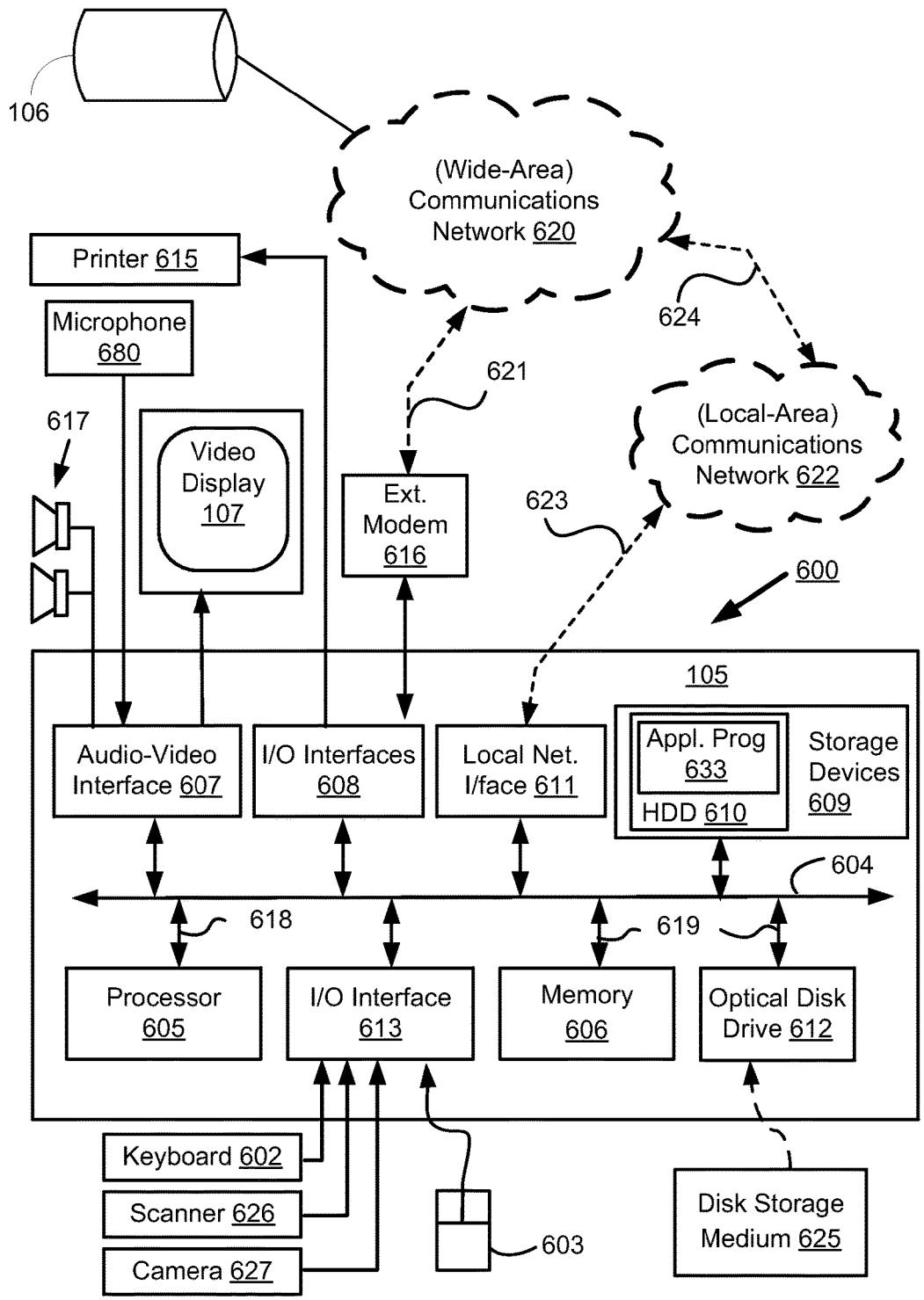
FIGS. 6A and 6B form a schematic block diagram of a general purpose computer system upon which arrangements described can be practiced.
Figure 6B:
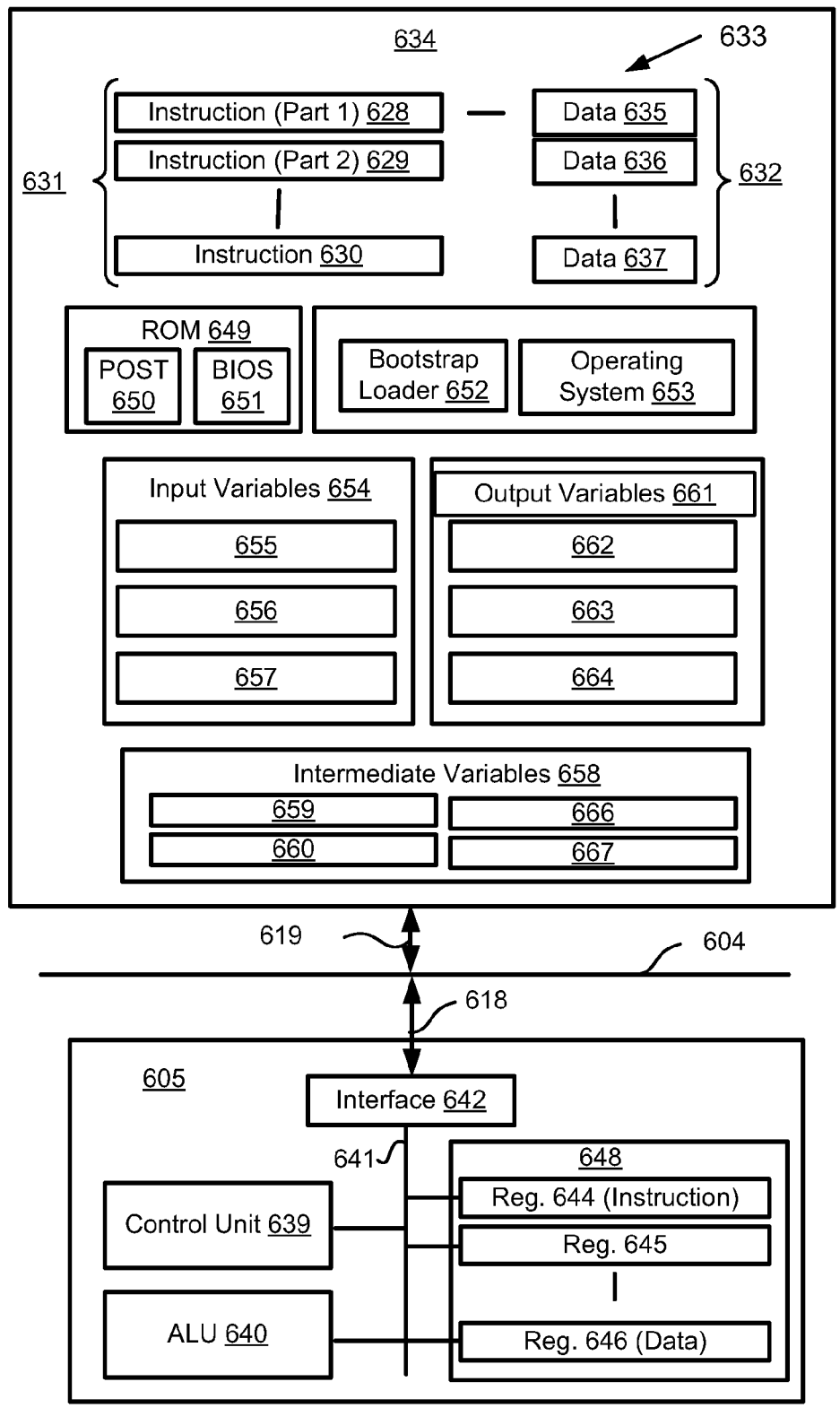

FIGS. 6A and 6B depict a general-purpose computer system 600, upon which the various EBPS arrangements described can be practiced. Alternately, the EBPS arrangements can be implemented using an embedded processor arrangement incorporated into the microscope 101. As seen in FIG. 6A, the computer system 600 includes: the computer module 105; input devices such as a keyboard 602, a mouse pointer device 603, a scanner 626, a camera 627, and a microphone 680; and output devices including a printer 615, the display device 107 and loudspeakers 617. An external Modulator-Demodulator (Modem) transceiver device 616 may be used by the computer module 105 for communicating to and from the database 106 over a communications network 620 via a connection 621. The communications network 620 may be a wide-area network (WAN), such as the Internet, a cellular telecommunications network, or a private WAN. Where the connection 621 is a telephone line, the modem 616 may be a traditional "dial-up" modem. Alternatively, where the connection 621 is a high capacity (e.g., cable) connection, the modem 616 may be a broadband modem. A wireless modem may also be used for wireless connection to the communications network 620.

The computer module 105 typically includes at least one processor unit 605, and a memory unit 606. For example, the memory unit 606 may have semiconductor random access memory (RAM) and semiconductor read only memory (ROM). The computer module 105 also includes an number of input/output (I/O) interfaces including: an audio-video interface 607 that couples to the video display 107, loudspeakers 617 and microphone 680; an I/O interface 613 that couples to the keyboard 602, mouse 603, scanner 626, camera 627 and optionally a joystick or other human interface device (not illustrated); and an interface 608 for the external modem 616 and printer 615. In some implementations, the modem 616 may be incorporated within the computer module 105, for example within the interface 608. The computer module 105 also has a local network interface 611, which permits coupling of the computer system 600 via a connection 623 to a local-area communications network 622, known as a Local Area Network (LAN). As illustrated in FIG. 6A, the local communications network 622 may also couple to the wide network 620 via a connection 624, which would typically include a so-called "firewall" device or device of similar functionality. The local network interface 611 may comprise an Ethernet™ circuit card, a Bluetooth™ wireless arrangement or an IEEE 802.11 wireless arrangement; however, numerous other types of interfaces may be practiced for the interface 611.

The I/O interfaces 608 and 613 may afford either or both of serial and parallel connectivity, the former typically being implemented according to the Universal Serial Bus (USB) standards and having corresponding USB connectors (not illustrated). Storage devices 609 are provided and typically include a hard disk drive (HDD) 610. Other storage devices such as a floppy disk drive and a magnetic tape drive (not illustrated) may also be used. An optical disk drive 612 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 600.

The components 605 to 613 of the computer module 105 typically communicate via an interconnected bus 604 and in a manner that results in a conventional mode of operation of the computer system 600 known to those in the relevant art. For example, the processor 605 is coupled to the system bus 604 using a connection 618. Likewise, the memory 606 and optical disk drive 612 are coupled to the system bus 604 by connections 619. Examples of computers on which the described arrangements can be practised include IBM-PC's and compatibles, Sun Sparcstations, Apple Mac™ or a like computer systems.

The EBPS method of may be implemented using the computer system 600 wherein the processes of FIGS. 2, 4, 5, and 7-12, to be described, may be implemented as one or more EBPS software application programs 633 executable within the computer system 600. In particular, the steps of the EBPS method are effected by instructions 631 (see FIG. 6B) in the EBPS software 633 that are carried out within the computer system 600. The software instructions 631 may be formed as one or more code modules, each for performing one or more particular tasks. The software may also be divided into two separate parts, in which a first part and the corresponding code modules performs the EBPS methods and a second part and the corresponding code modules manage a user interface between the first part and the user.

The EBPS software may be stored in a computer readable medium, including the storage devices described below, for example. The software is loaded into the computer system 600 from the computer readable medium, and then executed by the computer system 600. A computer readable medium having such software or computer program recorded on the computer readable medium is a computer program product. The use of the computer program product in the computer system 600 preferably effects an advantageous apparatus for implementing the EBPS arrangements.

The EBPS software 633 is typically stored in the HDD 610 or the memory 606. The software is loaded into the computer system 600 from a computer readable medium, and executed by the computer system 600. Thus, for example, the software 633 may be stored on an optically readable disk storage medium (e.g., CD-ROM) 625 that is read by the optical disk drive 612. A computer readable medium having such software or computer program recorded on it is a computer program product. The use of the computer program product in the computer system 600 preferably effects an apparatus for performing the EBPS methods.

In some instances, the EBPS application programs 633 may be supplied to the user encoded on one or more CD-ROMs 625 and read via the corresponding drive 612, or alternatively may be read by the user from the networks 620 or 622. Still further, the software can also be loaded into the computer system 600 from other computer readable media. Computer readable storage media refers to any non-transitory tangible storage medium that provides recorded instructions and/or data to the computer system 600 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 105. Examples of transitory or non-tangible computer readable transmission media that may also participate in the provision of software, application programs, instructions and/or data to the computer module 105 include radio or infra-red transmission channels as well as a network connection to another computer or networked device, and the Internet or Intranets including e-mail transmissions and information recorded on Websites and the like.

The second part of the EBPS application programs 633 and the corresponding code modules mentioned above may be executed to implement one or more graphical user interfaces (GUIs) to be rendered or otherwise represented upon the display 107. Through manipulation of typically the keyboard 602 and the mouse 603, a user of the computer system 600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 617 and user voice commands input via the microphone 680.

FIG. 6B is a detailed schematic block diagram of the processor 605 and a "memory" 634. The memory 634 represents a logical aggregation of all the memory modules (including the HDD 609 and semiconductor memory 606) that can be accessed by the computer module 105 in FIG. 6A.

When the computer module 105 is initially powered up, a power-on self-test (POST) program 650 executes. The POST program 650 is typically stored in a ROM 649 of the semiconductor memory 606 of FIG. 6A. A hardware device such as the ROM 649 storing software is sometimes referred to as firmware. The POST program 650 examines hardware within the computer module 105 to ensure proper functioning and typically checks the processor 605, the memory 634 (609, 606), and a basic input-output systems software (BIOS) module 651, also typically stored in the ROM 649, for correct operation. Once the POST program 650 has run successfully, the BIOS 651 activates the hard disk drive 610 of FIG. 6A. Activation of the hard disk drive 610 causes a bootstrap loader program 652 that is resident on the hard disk drive 610 to execute via the processor 605. This loads an operating system 653 into the RAM memory 606, upon which the operating system 653 commences operation. The operating system 653 is a system level application, executable by the processor 605, to fulfil various high level functions, including processor management, memory management, device management, storage management, software application interface, and generic user interface.

The operating system 653 manages the memory 634 (609, 606) to ensure that each process or application running on the computer module 105 has sufficient memory in which to execute without colliding with memory allocated to another process. Furthermore, the different types of memory available in the system 600 of FIG. 6A must be used properly so that each process can run effectively. Accordingly, the aggregated memory 634 is not intended to illustrate how particular segments of memory are allocated (unless otherwise stated), but rather to provide a general view of the memory accessible by the computer system 600 and how such is used.

As shown in FIG. 6B, the processor 605 includes a number of functional modules including a control unit 639, an arithmetic logic unit (ALU) 640, and a local or internal memory 648, sometimes called a cache memory. The cache memory 648 typically includes a number of storage registers 644-646 in a register section. One or more internal busses 641 functionally interconnect these functional modules. The processor 605 typically also has one or more interfaces 642 for communicating with external devices via the system bus 604, using a connection 618. The memory 634 is coupled to the bus 604 using a connection 619.

The application program 633 includes a sequence of instructions 631 that may include conditional branch and loop instructions. The program 633 may also include data 632 which is used in execution of the program 633. The instructions 631 and the data 632 are stored in memory locations 628, 629, 630 and 635, 636, 637, respectively. Depending upon the relative size of the instructions 631 and the memory locations 628-630, a particular instruction may be stored in a single memory location as depicted by the instruction shown in the memory location 630. Alternately, an instruction may be segmented into a number of parts each of which is stored in a separate memory location, as depicted by the instruction segments shown in the memory locations 628 and 629.

In general, the processor 605 is given a set of instructions which are executed therein. The processor 605 waits for a subsequent input, to which the processor 605 reacts by executing another set of instructions. Each input may be provided from one or more of a number of sources, including data generated by one or more of the input devices 602, 603, data received from an external source across one of the networks 620, 602, data retrieved from one of the storage devices 606, 609 or data retrieved from a storage medium 625 inserted into the corresponding reader 612, all depicted in FIG. 6A. The execution of a set of the instructions may in some cases result in output of data. Execution may also involve storing data or variables to the memory 634.

The disclosed EBPS arrangements use input variables 654, which are stored in the memory 634 in corresponding memory locations 655, 656, 657. The EBPS arrangements produce output variables 661, which are stored in the memory 634 in corresponding memory locations 662, 663, 664. Intermediate variables 658 may be stored in memory locations 659, 660, 666 and 667.

Referring to the processor 605 of FIG. 6B, the registers 644, 645, 646, the arithmetic logic unit (ALU) 640, and the control unit 639 work together to perform sequences of micro-operations needed to perform "fetch, decode, and execute" cycles for every instruction in the instruction set making up the program 633. Each fetch, decode, and execute cycle comprises:
  a fetch operation, which fetches or reads an instruction 631 from a memory location 628, 629, 630;
  a decode operation in which the control unit 639 determines which instruction has been fetched; and
  an execute operation in which the control unit 639 and/or the ALU 640 execute the instruction.

Thereafter, a further fetch, decode, and execute cycle for the next instruction may be executed. Similarly, a store cycle may be performed by which the control unit 639 stores or writes a value to a memory location 632.

Each step or sub-process in the processes of FIGS. 2, 4, 5, and 7-12 is associated with one or more segments of the program 633 and is performed by the register section 644, 645, 647, the ALU 640, and the control unit 639 in the processor 605 working together to perform the fetch, decode, and execute cycles for every instruction in the instruction set for the noted segments of the program 633.

The EBPS methods may alternatively be implemented in dedicated hardware such as one or more gate arrays and/or integrated circuits performing the EBPS functions or sub functions. Such dedicated hardware may also include graphic processors, digital signal processors, or one or more microprocessors and associated memories. If gate arrays are used, the process flow charts in FIGS. 2, 4, 5, and 7-12 are converted to Hardware Description Language (HDL) form. This HDL description is converted to a device level netlist which is used by a Place and Route (P&R) tool to produce a file which is downloaded to the gate array to program it with the design specified in the HDL description.

Figure 2:
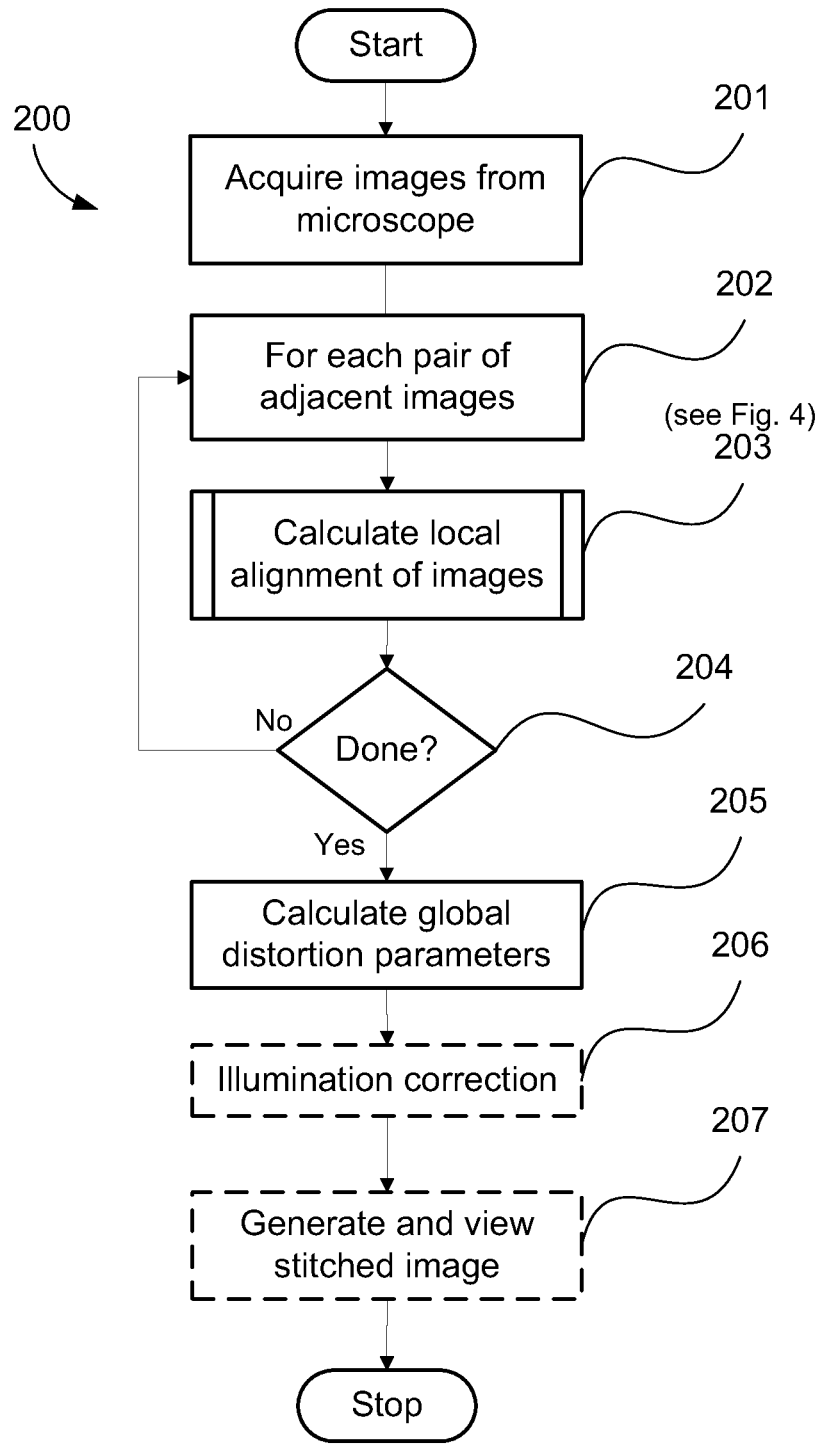
FIG. 2 is a schematic flow diagram illustrating a method of creating a microscope mosaicked virtual image from many offset captured images according to a EBPS arrangement.

A high level flow chart of a computer executable method that can be used to calculate the alignment operations is shown in FIG. 2. The images (also referred to as "tile images" or "tiles") to be stitched are acquired from the microscope in a step 201, by the process described previously with reference to FIG. 1. Once the images are captured they are transmitted to the computer 105. In a following step 202, performed by the processor 605 directed by the software program 633, the computer 105 takes all pairs of adjacent images in the image array of FIG. 3b. The computer 105 then determines the local alignment information for each of these pairs of adjacent images in a following step 203, performed by the processor 605 directed by the software program 633, described hereinafter in more detail with reference to FIG. 4. This process is repeated for the next horizontally or vertically adjacent pairing until all adjacent tile pairings have been determined, as established by a decision step 204, performed by the processor 605 directed by the software program 633.

The local alignment information gathered for all pairings is then used in a following step 205, performed by the processor 605 directed by the software program 633, to determine the global alignment operations (also referred to as the global distortion parameters) required to fit all (or a subset of) the individual images together into a seamless composite mosaic image. Optionally, illumination correction over the images may be calculated in a following step 206, performed by the processor 605 directed by the software program 633. After this step the global alignment operations and illumination corrections can be applied to the individual images and the images can be combined to form a single composite image, in a following step 207, performed by the processor 605 directed by the software program 633.

These images and the operations required to align and display then represent a virtual slide. Alternatively the images, the alignment operations, and the illumination corrections can be stored in the database 106, or transmitted over the network 620 and the image generated and viewed at a later time and/or at a remote display system.

Overview of the EBPS Arrangement

The EBPS approach is now described in broad terms. The EBPS arrangement involves finding (a) a relationship between the number of alignment patches, their locations, and their sizes and (b) the Cramér-Rao lower bound (CRLB) on the variance of the coordinate transform, which is here taken to be an affine transform, estimated from shift estimates of each patch. In particular the EBPS arrangement finds patches that minimise the variance of the maximum coordinate error in the location of pixels within the overlap region due to errors in the estimated affine coordinate transform. In order to estimate the parameters p of this affine coordinate transform only local shifts of small patches are used in the examples described in this specification. However, additional measurements such as the x and y scaling of the patches can also be used.

The EBPS arrangement estimates the parameters of the affine coordinate transformation that maps the pixels in one image to pixels in another image. The two images in question are adjacent images captured by the camera 103 in FIG. 1 which are to be stitched together. In the particular case of the affine transform a pixel location $x=[x, y]^T$ in one image, where x and y are the horizontal and vertical coordinates respectively, is mapped to a pixel location $x'=[x', y']^T$ in the other image by the affine transform given by Equation [1] as follows:

$$x' = \begin{bmatrix} a & b \\ c & d \end{bmatrix} x + \begin{bmatrix} e \\ f \end{bmatrix}. \quad [1]$$

where a, b, c, and d are the linear transform parameters governing scaling, rotation, and shear and e and f are translation parameters. These affine parameters can be expressed as an affine transform parameter vector p given by Equation [2] as follows:

$$p = [a\ b\ c\ d\ e\ f]^T. \quad [2]$$

where a, b, c, d, e, and f are the parameters for the affine transform given by Equation [1], and the superscript T represents the transpose operation.

It is assumed that the shift between the location of a pixel in image 1 and the transformed location of the corresponding pixel in image 2 for each of n locations in the image can be measured. The shift in the x and y directions of a pixel at a location $x_k=[x_k, y_k]^T$ is given by the vector $s_k=x'_k-x_k$. The vector s of shift estimates for all n patches is given by Equation [3] as follows:

$$s = \begin{bmatrix} s_1 \\ \vdots \\ s_n \end{bmatrix}, \quad [3]$$

where $s_k=[s_x^{(k)}, s_y^{(k)}]^T$ is the 2-component vector of the x and y shift at the kth patch location $x_k$ where k is the patch number between 1 and n, and n is the number of locations.

The affine transform parameter vector p in Equation [2] can be estimated as shown in the following Equation [4] from a measured value of the shift vector ŝ using a least-squares estimate as follows:

$$\hat{p} = A^+(x_1, \ldots, x_n)\hat{s} \quad [4]$$

where $\hat{p}$ is the coordinate transform parameter estimate, $A^+=(A^TA)^{-1}A^T$ is the Moore-Penrose pseudo-inverse of A, and A is the parameter estimation matrix for n patches at the locations $(x_k, y_k)$, and $\bullet^{-1}$ represents the matrix inverse operator. The parameter estimation matrix A is given by Equation [5] as follows:

$$A(x_1, \ldots, x_n) = W \begin{bmatrix} x_1 & y_1 & 0 & 0 & 1 & 0 \\ 0 & 0 & x_1 & y_1 & 0 & 1 \\ \vdots & & & & & \vdots \\ x_n & y_n & 0 & 0 & 1 & 0 \\ 0 & 0 & x_n & y_n & 0 & 1 \end{bmatrix}, \quad [5]$$

where W is a weighting matrix for example given by Equation [27], and $(x_k, y_k)$ are the x and y locations of the patches.

Because the shifts at the patch locations are measured from the image values within the patch, the estimated shifts, $s_x$ and $s_y$, will have errors associated with them. A lower bound for the covariance of these estimated shifts, $cov(s_x, s_y)$, can be determined by assuming that the pixel values of the images are corrupted by Gaussian noise. The Cramér-Rao lower bound on the covariance of the estimated shifts at the patch locations is given by the following equation:

$$cov(s_x, s_y) \geq J(x,y)^{-1}, \quad [6]$$

where the matrix $J(x, y)$ represents the gradient structure matrix J evaluated at a coordinate $(x, y)$, given by the following equation:

$$J(x, y) = \sum_{i,j} w(i, j) \begin{bmatrix} I_x^2(x+i, y+j) & I_x(x+i, y+j)I_y(x+i, y+j) \\ I_x(x+i, y+j)I_y(x+i, y+j) & I_y^2(x+i, y+j) \end{bmatrix}. \quad [7]$$

where $I(x, y)$ is the image pixel value at the coordinate $(x, y)$, $I_x(x, y)$ is the gradient of the image pixel values in the x direction at the coordinate $(x, y)$, $I_y(x, y)$ is the gradient of the image pixel values in they direction at the coordinate $(x, y)$, $w(x, y)$ is a weighting function such as a 2D Tukey windowing function; however, many other windowing functions can be used.

The covariance of the estimate of the affine transform parameter vector $\hat{p}$ can now be expressed with respect to the covariance of the shift estimates, $cov(s)$, as follows:

$$cov(\hat{p}) = A^+ cov(s)(A^+)^T \quad [8]$$

where $A^+$ is the Moore-Penrose pseudo-inverse of the estimation matrix A given by Equation [5], and $cov(s)$ is the covariance of the shift estimate vector s.

The Cramer-Rao lower bound for each individual shift $s_k$ can be used as an approximation to the covariance matrix for all shift estimates. This assumes that the shift estimates $s_k$ from each patch are independent, which is a good approximation if the patches do not overlap. In this case the patch shift-covariance matrix C is given by the following:

$$C(J_1, \ldots, J_n) = \begin{bmatrix} J_1^{-1} & & & \\ & J_2^{-1} & & \\ & & \ddots & \\ & & & J_n^{-1} \end{bmatrix}, \quad [9]$$

where $J_k = J(x_k, y_k)$ is the gradient structure matrix for the patch location $(x_k, y_k)$.

The patch shift-covariance matrix C in Equation [9] represents the best available approximation to the covariance matrix $cov(s)$ of the measurements of the shifts $s_k$ at the patch locations $(x_k, y_k)$, therefore it can be used to calculate the transform estimation weighting matrix W. In particular the transform estimation weighting matrix W used in Equation [5] can be a matrix square root of the patch shift-covariance matrix C in Equation [9], which can be calculated using the Cholesky decomposition. This in essence down-weights the measurements of the shifts $s_k$ with a high variance and correctly incorporates measurements that have high variances in different directions (the aperture problem).

If the covariance of the affine transform parameter vector $\hat{p}$ given by Equation [8] is used directly then typically errors in the affine parameters a, b, c, and d will lead to a much larger error at the edges of the image than an equivalent sized error in parameters e and f. Therefore, to create a metric that can be used to estimate the accuracy of the affine transform of Equation [1] represented by the affine transform parameter vector p, a weighting matrix M is introduced. This weighting matrix M is chosen to scale the affine parameters so that the product Mp of the weighting matrix M with the transform parameter vector p represents the variance of the maximal pixel offset in the image that is due to a single parameter. This gives a scaled parameter estimation matrix, written as follows:

$$A_M(x_1, \ldots, x_n) = A(x_1, \ldots, x_n)M^{-1}. \quad [10]$$

where $A_m$ is the scaled parameter estimation matrix, A is the parameter estimation matrix of Equation [5], M is the weighting matrix, and $x_1, \ldots, x_n$ are the n patch locations.

A scaled error metric $\beta$ can now be used to evaluate the variance of the misregistration of the pixels in the image. This scaled error metric $\beta$ can be expressed as the norm of the scaled covariance matrix, $$\beta(x_1, \ldots, x_n) = \|A_M^T(x_1, \ldots, x_n)C^{-1}(J_1, \ldots, J_n)A_M(x_1, \ldots, x_n))^{-1}\| \quad [11]$$

where $A_m$ is the scaled parameter estimation matrix of Equation [10], C patch shift covariance matrix of Equation [9], $J_1, \ldots, J_n$ are the gradient structure matrices evaluated at the patches, and $x_1, \ldots, x_n$ are the n patch locations. In Equation [11] several matrix norms can be used, such as the 2-norm or the Frobenius norm.

The best n patches to use to estimate the affine transform of Equation [1], given the assumptions that have been made, is equivalent to finding the minimum of the error metric $\beta$ of Equation [11] for all possible patch locations $x_1, \ldots, x_n$. The full minimisation of the error metric $\beta$ is too slow if applied over all possible patch locations in the image, namely all pixel locations. This problem can be solved by first calculating a set of potentially good patch locations by another method, and then using the error metric $\beta$ to rank subsets of these candidate locations. These candidate alignment patch locations can be chosen from a grid, randomly, or from a feature selection algorithm.

As the value of the error metric $\beta$ monotonically decreases as the number of patches increases, branch-and-bound techniques can be applied to give the rigorous global optimum with less than the full number of searches. Furthermore, the optimisation method need not find the rigorous global optimum; rather approximate optimization techniques almost always greatly improve the alignment accuracy and are significantly most efficient. Several approximate optimization techniques can be used to find an approximately optimal set of patches, for example sequential forward selection (SFS) and sequential backward selection (SBS). The SBS algorithm starts with the full set of candidate patch locations and evaluates the error metric $\beta$ for all sets of patches containing all but one of the candidate patches. The best set is chosen as the set for which the error metric β is the minimum, indicating that the patch removed contributes least to lowering the error metric β. The procedure is continued until the minimum number of patches required to estimate the parameters remains.

The aperture problem is the name given to the large uncertainty of measuring differences between two line features in a direction parallel to a line feature, here a line feature refers to a feature that has significant structure in only one dimension. Specifically, the shift of a line feature can only be determined accurately in the direction orthogonal to the line, and any shift estimate in a direction parallel to the line will be erroneous.

It is possible to use only line features to estimate the affine transform parameter vector p; however, the selection of which line features will be good to use in an estimate of the affine transform is non-trivial. For example, taking only horizontal lines clearly gives no information about deformations in the horizontal direction. Similarly, taking lines all radiating from a single point gives no information about the magnification about that point. However, the error metric β of Equation [11] implicitly calculates the effect of shift estimates from line-like features on the variance of all parameters in the affine transform. Minimising the error metric β will thus select the appropriate line or corner features that minimise the variance of global affine transform of Equation [1].

ADVANTAGE

Figure 14:
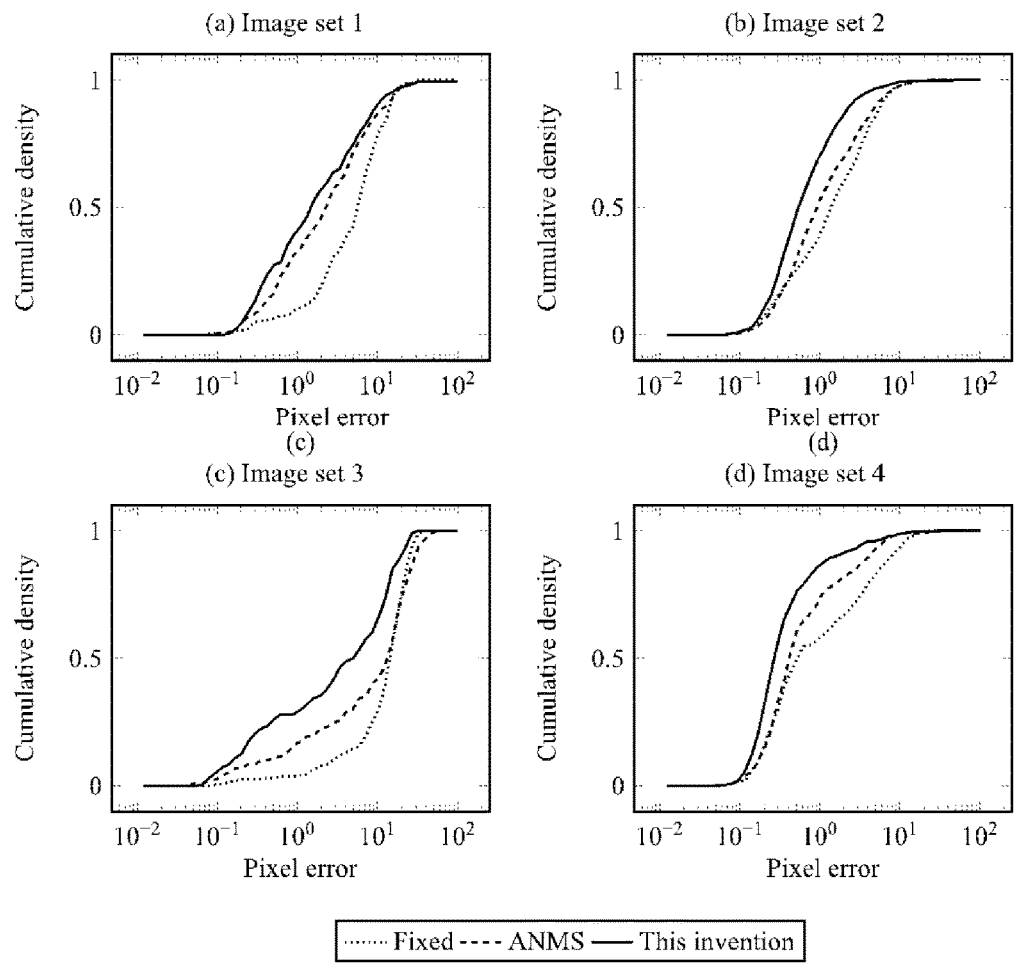
FIG. 14 is a graph showing statistical results for the accuracy of applying the method of FIG. 4 over four sets of test images.

The performance of the EBPS arrangement is presented in Table 1. This lists the mean errors in four different sets of microscope images. Three different algorithms are used to select patches in the thin 1550×200 pixel nominal overlap region between adjacent images. The algorithms used to select patches are the EBPS arrangement, adaptive non-maximal suppression (ANMS), and taking five patches at fixed locations spaced equally throughout the overlap. The second image is the same as the first with a rotation, scaling, and translation (RST) transform applied with a rotation randomly chosen within in the range of ±0.005 radians, a scaling is in range of 1±0.005, and a translation is in the range ±10 pixels. The improvement of the mean corner offset error for the EBPS arrangement over ANMS is given for each image set, and this ranges from a 36% to a 64% improvement for the EBPS arrangement. Additionally FIG. 14 shows the cumulative density of the maximum errors in the shifts between the corners of the overlap region, given in pixels for all four sets of test images. This shows that the maximum overlap errors are reduced using the EBPS arrangement for all images across the entire distribution of errors.

TABLE 1

The mean corner offset errors for three different algorithms.

| Algorithm | Image 1 | Image 2 | Image 3 | Image 4 |
| --- | --- | --- | --- | --- |
| Fixed patches | 6.66 | 1.67 | 17.5 | 0.611 |
| ANMS | 2.76 | 1.1 | 16.3 | 0.505 |
| EBPS arrangement | 1.76 | 0.657 | 5.9 | 0.319 |
| Improvement | 36% | 40% | 64% | 37% |

EBPS Arrangement No. 1

Figure 4:
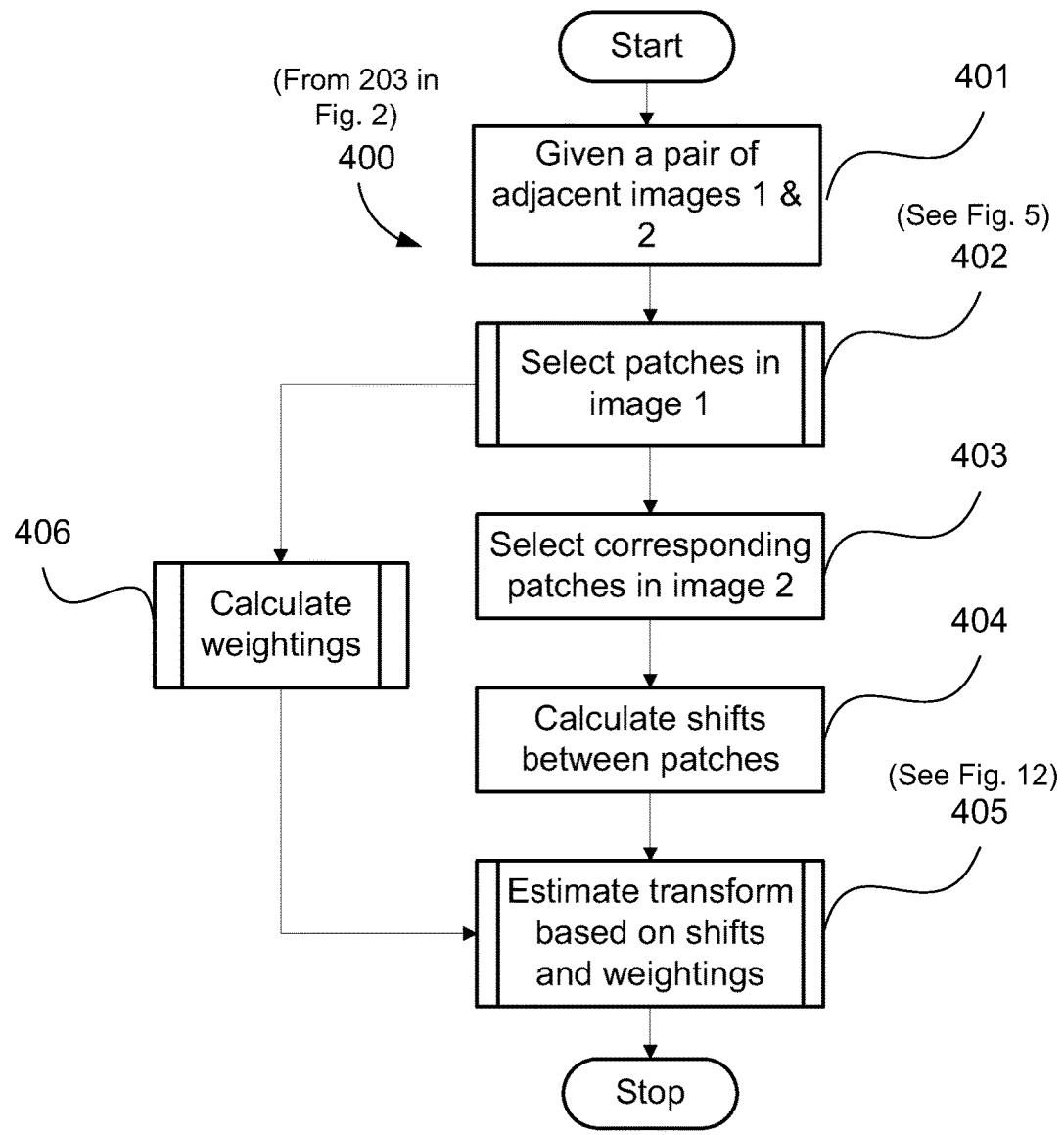
FIG. 4 is a schematic flow diagram illustrating a method of calculating the local alignment of adjacent images as performed in step 203 of FIG. 2.

The local alignment process step 203 between adjacent pairs of images is depicted in FIG. 4 as a process 400.

Figure 3B:
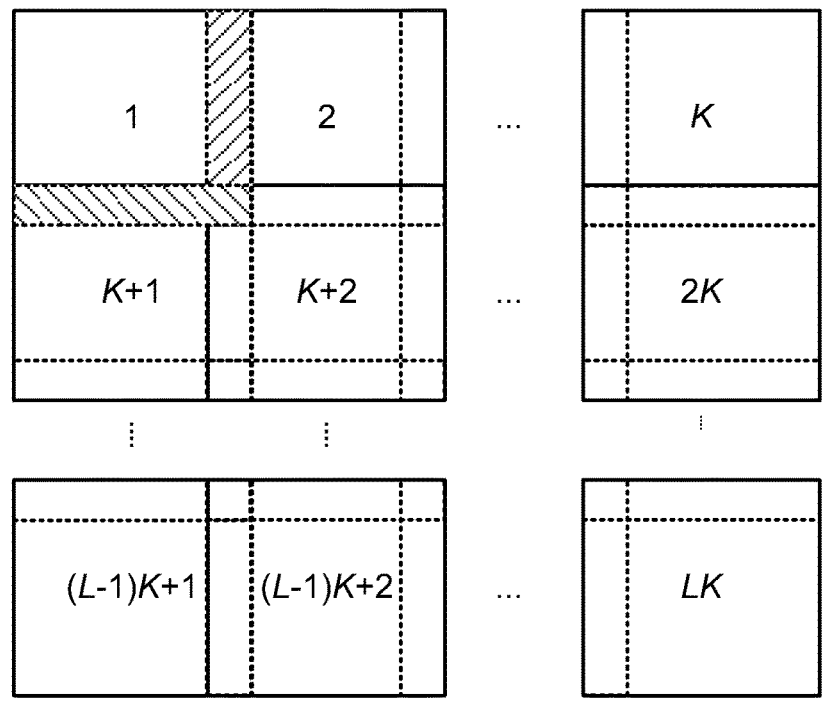
FIG. 3b is an illustration of the captured image tiles as used to make a mosaicked image as produced by the method of FIG. 2.
Figure 3C:
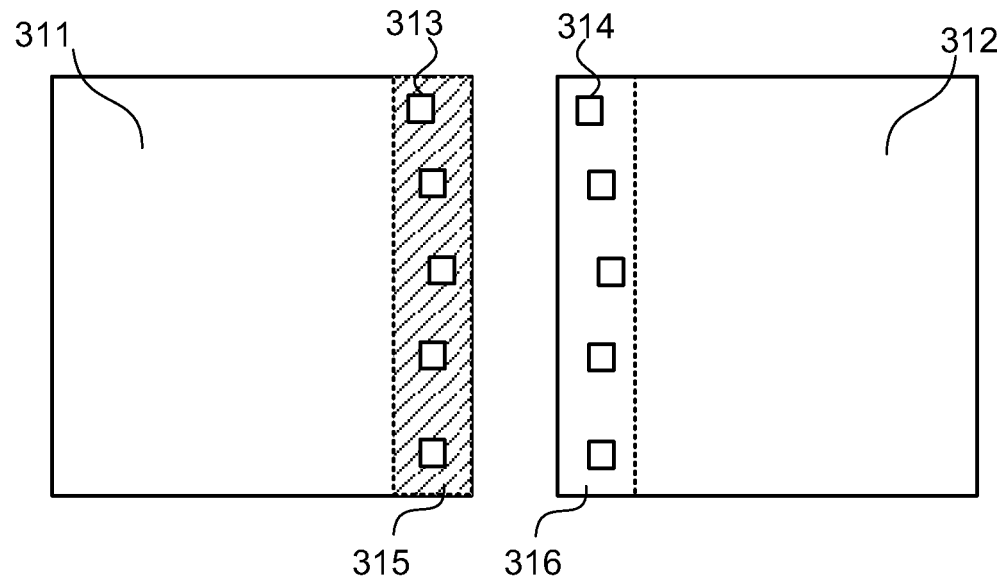
FIG. 3c is an illustration of the patches selected on an image overlap region between two horizontally adjacent image tiles as used by the method of FIG. 4.

The input to this process 400 in step 401 is a pair of adjacent images from the captured array shown in FIG. 3b. These adjacent images are either horizontally or vertically adjacent. The EBPS method is discussed with reference to two example horizontally adjacent images that are shown in FIG. 3c. All steps apply to vertically adjacent images if the x and y coordinates are swapped. The essential idea is to determine the distortion (ie the affine transform) required to be applied to image 2 (ie 312) such that the pixels in the overlap region of image 2 (ie 316) match the pixels in the overlap region of image 1 (ie 315).

This is performed as follows. The locations of the small patches 313 within one of the images 311 is calculated in a following step 402, performed by the processor 605 directed by the software program 633, described hereinafter in more detail with reference to FIG. 5. In a following step 403, performed by the processor 605 directed by the software program 633, locations of corresponding patches 314 in the adjacent image 312 is determined. These corresponding patch locations are the locations of the patches 313 in the first image 311 mapped to the locations in the second image 312 using the best a-priori knowledge available of the geometric relationship between the two images before the analysis.

The specimen 102 is fixed in a affine position, and the tolerance on the optical and physical errors in the microscope 101 are known. Additionally, tolerances of the movement of the microscope stage are well controlled, and typically cause errors of microns in shifts, and tens of milliradians in rotation. Due to the aforementioned tight tolerances, the patches can be positioned in a way that ensures a large overlap between the corresponding patches in both images. Alternatively, a coarse alignment technique can be used to approximate the alignment between the images, and the corresponding patch locations can be calculated with reference to this approximate alignment.

Figure 3D:
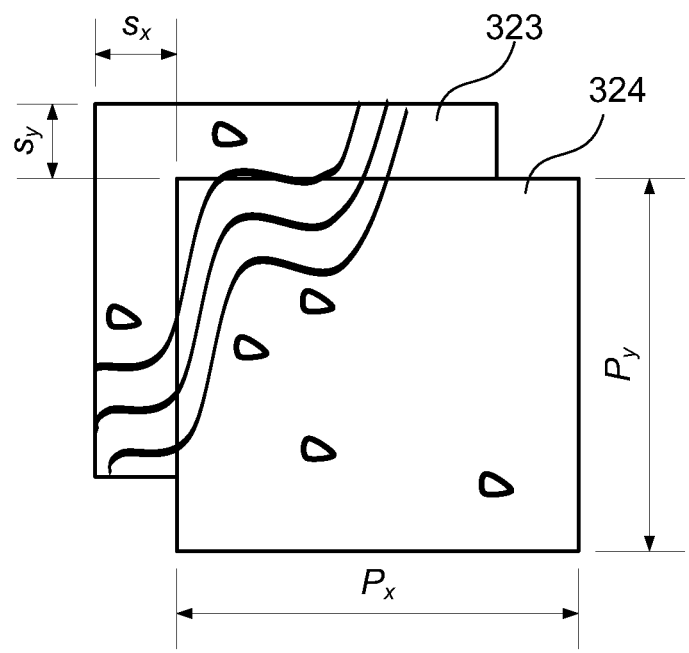
FIG. 3d is an illustration of the shift estimate calculated between two patches in adjacent image tiles as used by the method of FIG. 4.

Next, in a following step 404, performed by the processor 605 directed by the software program 633, the shifts between patches are determined by a shift estimation method such as a correlation-based or gradient-based method. This described with reference to FIG. 3d which shows two patches from different images. The shift is the vector $s=[s_x, s_y]^T$ which reflects the amount in the horizontal and vertical axes that the patch from image 2 (ie 324) must be offset from the patch from image 1 (ie 323) to make the areas in both patches where they overlap the most similar to each other, which is typically measured as the sum of squared differences of the pixel values between the areas of overlap of the two patches.

Additionally, an anisotropic transform estimation weighting matrix W given by Equation [27] is calculated in a step 406 from the direction and magnitude of the gradients of the pixel values in the overlap region 315 within the selected patches 313. Finally in a following step 405, performed by the processor 605 directed by the software program 633, described hereinafter in more detail with reference to FIG. 12, the patch locations $x_1, \ldots, x_n$, the estimated shifts $s_1, \ldots, s_n$ calculated in 404, and the anisotropic weighting matrix W given by Equation [27] calculated in 406 are used to estimate the affine coordinate transform parameter vector p.

Figure 5:
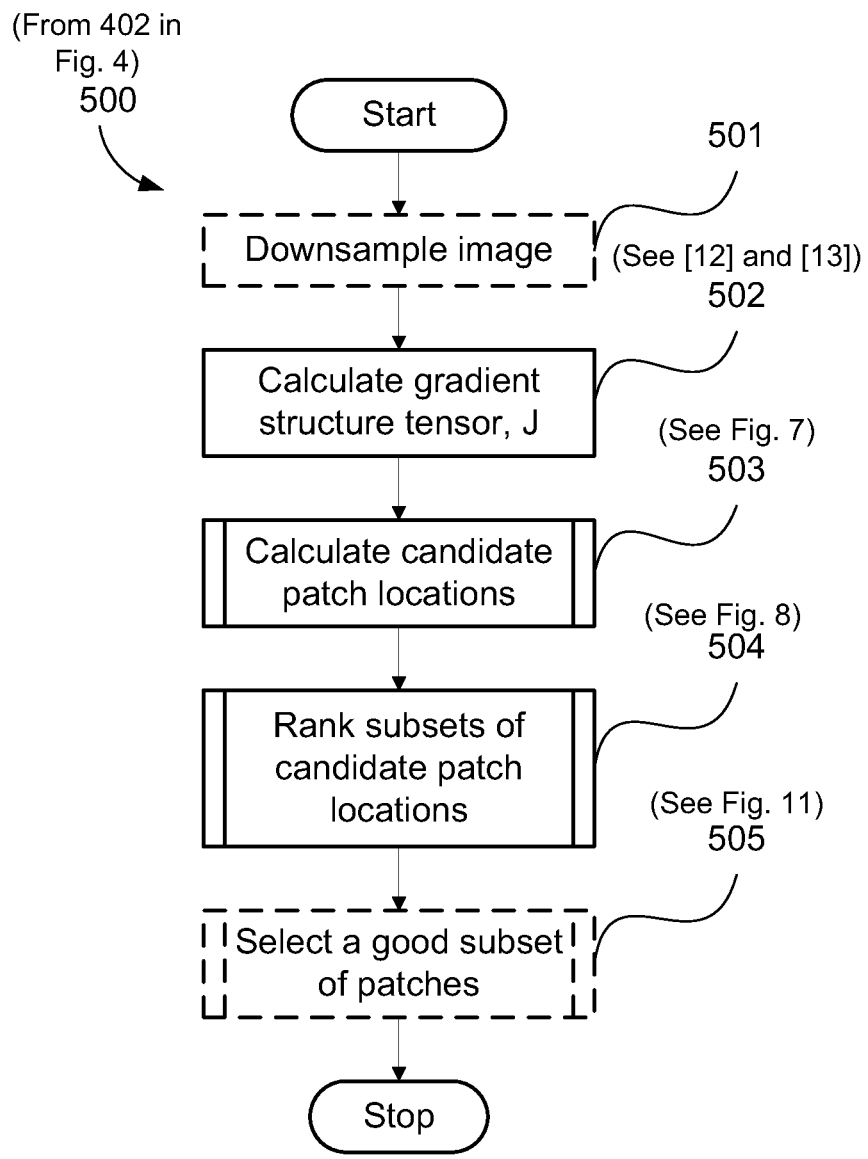
FIG. 5 is a schematic flow diagram illustrating a method of selecting the image patches as performed in step 402 of FIG. 4.

The patch-selection step of 402 is shown in detail, depicted as a process 500, in FIG. 5. The initial input is one image 313 of the two adjacent images in FIG. 3c. Optionally this image can be downsampled in a step 501, performed by the processor 605 directed by the software program 633, to a lower resolution to enable fast computation. Typically a downsampling of 4 times is used, which speeds the computation without significantly reducing the accuracy. After this step, discrete approximations to the x and y image gradients $I_x$ and $I_y$ respectively are calculated in a following step 503, performed by the processor 605 directed by the software program 633. These image gradients are written $I_x$ and $I_y$ and represent the rate of change of the pixel values in the x and y directions respectively. These image gradients $I_x$ and $I_y$ are used to calculate a gradient structure matrices J(x, y) at locations (x, y) across the image. The gradient structure matrix J is a measure of how well the patch can be used to calculate the shifts in all directions. The gradient structure matrix J(x, y) is the weighted sum, over an area of the image centered at the location (x, y), of a matrix with diagonal entries being the x image gradient squared, $I_x^2$, and they image gradient squared, $I_y^2$, and off-diagonal entries being the product of the x and y gradients, $I_x I_y$. This is given by Equation [12] as follows:

$$J(x, y) = \sum_{i,j} w(i, j) \begin{bmatrix} I_x^2(x+i, y+j) & I_x(x+i, y+j)I_y(x+i, y+j) \\ I_x(x+i, y+j)I_y(x+i, y+j) & I_y^2(x+i, y+j) \end{bmatrix}. \quad [12]$$

where the summation occurs over indices i and j which range from negative half the patch size to positive half the patch size in x and y respectively, I(x, y) is the image pixel value at the coordinate (x, y), $I_x(x, y)$ is the gradient of the image pixel values in the x direction at the coordinate (x, y), $I_y(x, y)$ is the gradient of the image pixel values in they direction at the coordinate (x, y), w(x, y) is a weighting function such as a 2D Tukey windowing function; however, many other windowing functions can be used. The 2D Tukey window, expressed in Equation [13] below, is the product of two raised cosine functions with the parameter α representing the amount of tapering of the cosine window, $P_x$ representing the width of the patch, $P_y$ representing the height of the patch.

$$w(i, j) = \frac{1}{4}\left[1 + \cos\left(\pi\left\{\frac{2i}{\alpha(P_y - 1)} - 1\right\}\right)\right]\left[1 + \cos\left(\pi\left\{\frac{2j}{\alpha(P_y - 1)} - 1\right\}\right)\right]. \quad [13]$$

where (i, j) is the coordinate within the analysis patch, α is a width parameter typically taken to be 0.8, and $P_x$ and $P_y$ are the x and y sizes of the analysis patch respectively.

The gradient structure matrix J given by Equation [12] is then used to calculate the candidate patch locations in a following step 503, performed by the processor 605 directed by the software program 633, described hereinafter in more detail with reference to FIG. 7. This will give a large number of candidate patch locations, typically 4 or 5 times as many as will be finally used. In a following step, step 504, performed by the processor 605 directed by the software program 633, these candidate patches are ranked into subsets with increasing numbers of patches, as described hereinafter in more detail with reference to FIG. 8. In addition to the patch subsets, an error metric value β given by Equation [26] for each subset is determined in the step 504. This is used by a following step 505, performed by the processor 605 directed by the software program 633, to calculate which subset from the ranked list of subsets should be used to estimate the alignment of the images, which will be described in more detail with reference to FIG. 11.

Figure 7:
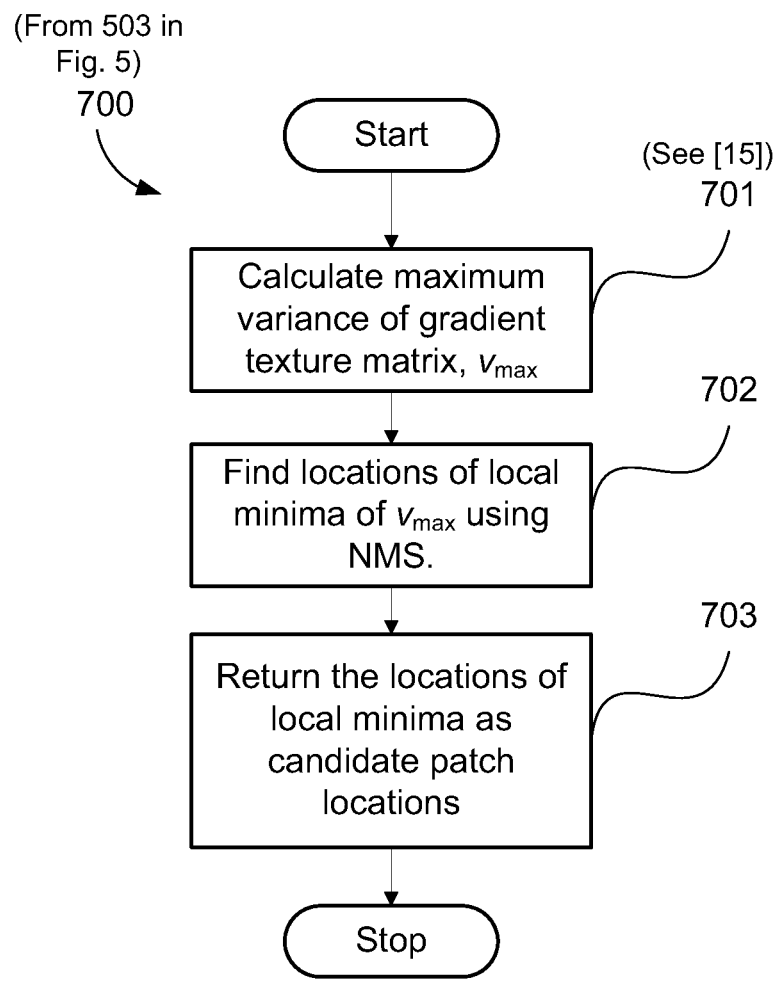
FIG. 7 is a schematic flow diagram illustrating a method of calculating candidate patch locations as performed in step 503 of FIG. 5.

FIG. 7 shows the process 700, for determining the candidate patch locations of the step 503. The candidate patch locations are chosen such that the patches at those locations have a large amount of texture, so that placing patches in those locations will enable a good estimate of the shift between the two images at that location to be determined. A lower bound on the covariance of the shifts $s_x$ and $s_y$ in the x and y directions respectively that is estimated from the pixels in a patch is given by the inverse of the gradient structure matrix J given by Equation [12] evaluated at the location of the patch (x, y), as given by Equation [14] as follows:

$$\text{cov}(s_x, s_y) \geq J(x,y)^{-1}. \quad [14]$$

where $\text{cov}(s_x, s_y)$ is the covariance of the shifts $s_x$ and $s_y$, and J(x, y) is the gradient structure matrix evaluated at the location of the patch (x, y).

In a step 701, performed by the processor 605 directed by the software program 633, the maximum variance of the shift is calculated as the 2-norm of the shift covariance bound, as given by Equation [15] as follows:

$$v_{max}(x,y) = \|J(x,y)^{-1}\|_2 \quad [15]$$

where $v_{max}(x, y)$ is the maximum variance of the shift, J(x, y) is the gradient structure matrix given by Equation [12], and $\|\cdot\|_2$ represents the matrix 2-norm. The maximum variance of the shift $v_{max}$ can equivalently be calculated as the inverse of the minimum eigenvalue of the gradient tensor matrix J given by Equation [12].

When the maximum variance of the shift $v_{max}$ given by Equation [15] is small, the patch shift estimate is expected to be good. In a following step 702, performed by the processor 605 directed by the software program 633, the candidate patch locations are set to be the locations of the local minima of the maximum variance of the shift $v_{max}$ given by Equation [15]. The local minima of maximum variance of the shift $v_{max}$ given by Equation [15] are calculated using a non-maximal suppression algorithm with an appropriate suppression radius. This suppression radius depends on the size of the image and the size of the patch. In the present EBPS implementation, for an analysis patch size of 64 pixels a suppression radius of 50 pixels is found to work well. These identified local minima are then returned as a list of candidate patch locations in a following step 703, performed by the processor 605 directed by the software program 633.

Alternatively, other methods can be used to choose suitable candidate patch locations. In particular, other metrics can be used to calculate good features instead of Equation [15]. These include, for example, using the Frobenius instead of the 2-norm in Equation [15], which is equivalent to the Harris corner detector, or using the maximum eigenvalue of the gradient tensor matrix J. Also the local minima of the maximum variance of the shift $v_{max}$ given by Equation [15] can be calculated using other methods, for example kd-tree based adaptive gridding methods, or fast disk-covering non-maximal suppression methods.

Figure 8:
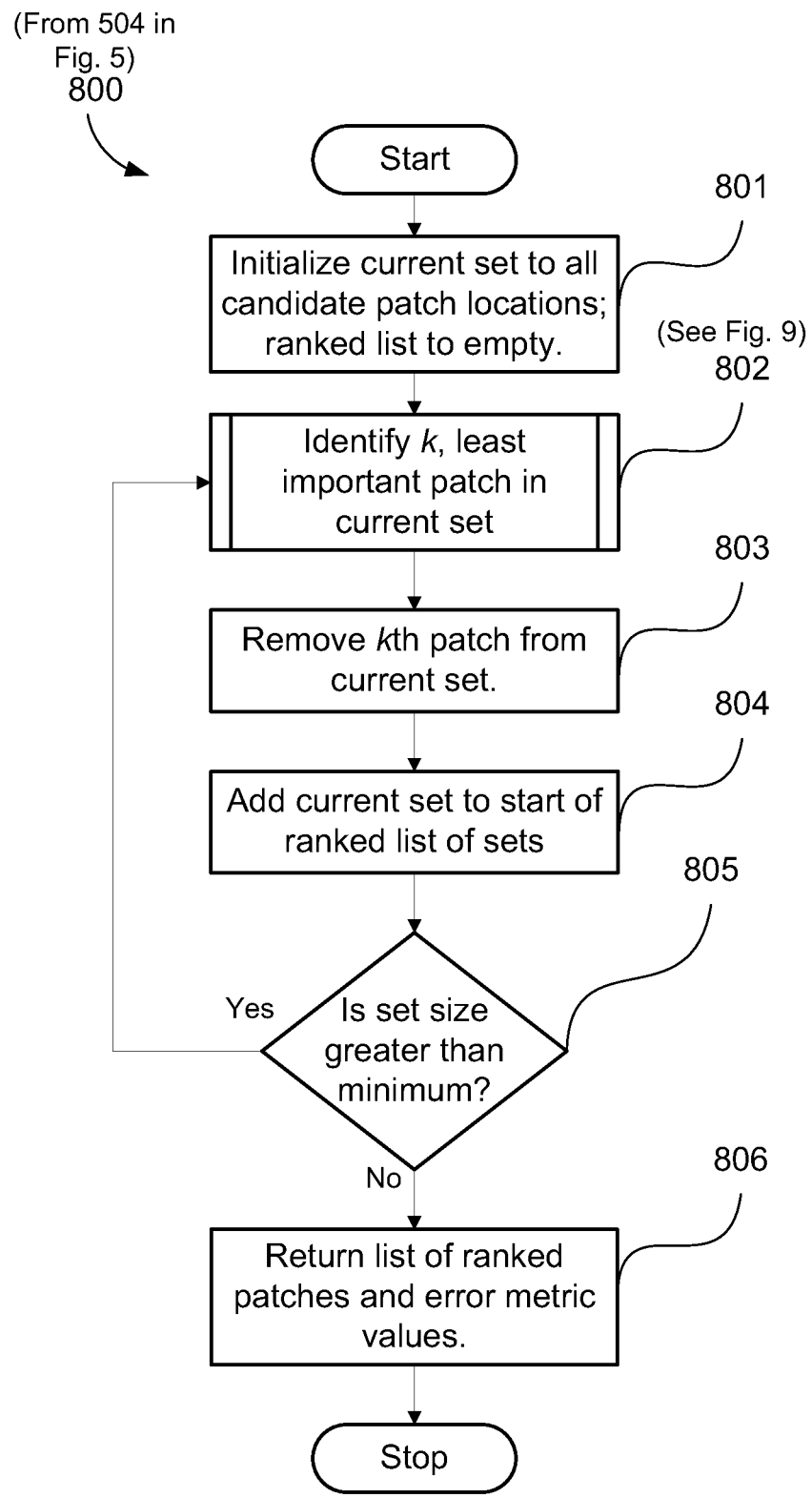
FIG. 8 is a schematic flow diagram illustrating a method of ranking subsets of candidate patch locations as performed in step 504 of FIG. 5.

FIG. 8 shows a flowchart 800, providing more details of an example of a calculation of the ranking of subsets of patch locations performed by the step 504. The process starts by initialising the set of candidate patches to contain all $N_c$ candidate patches, and by initialising the ranked list to "empty" in a step 801, performed by the processor 605 directed by the software program 633. In a following step 802, performed by the processor 605 directed by the software program 633, the single patch that is least important in the set is identified, and its number, k, is returned, as described hereinafter in more detail with reference to FIG. 9. The least important patch is that which, when removed from the current set, reduces the error metric β given by Equation [26] by the smallest amount.

In a following step 803, performed by the processor 605 directed by the software program 633, the least important patch is removed from the current set. In a following step 804, performed by the processor 605 directed by the software program 633, the current set is added to the start of the ranked list of sets. This ranked list of sets is initially empty. In a following step 805, performed by the processor 605 directed by the software program 633, the number of patches in the current set of patches is compared to the minimum number of patches required for the affine transform to be calculated. An affine transform has six unknown parameters and when measuring x and y shifts at each patch the minimum number of patches is three. If the minimum number has not been reached, processing returns to the step 802, otherwise it continues to a following step 806. At the step 806, performed by the processor 605 directed by the software program 633, the remaining patches in the current set are added to the start of the ranked list of sets and this ranked list and the associated error metric β values for each subset including that patch is returned.

The resulting ranked patch list gives a ranking of subsets of the candidate patches from the most important to least important set of patches. Alternatively, another algorithm can be used to rank the subsets according to the error metric β given by Equation [26] including an exhaustive search of all subsets, a branch-and-bound technique which eliminates unnecessary searching of sub-trees, or a forward iterative approach such as successive forward selection.

Figure 9:
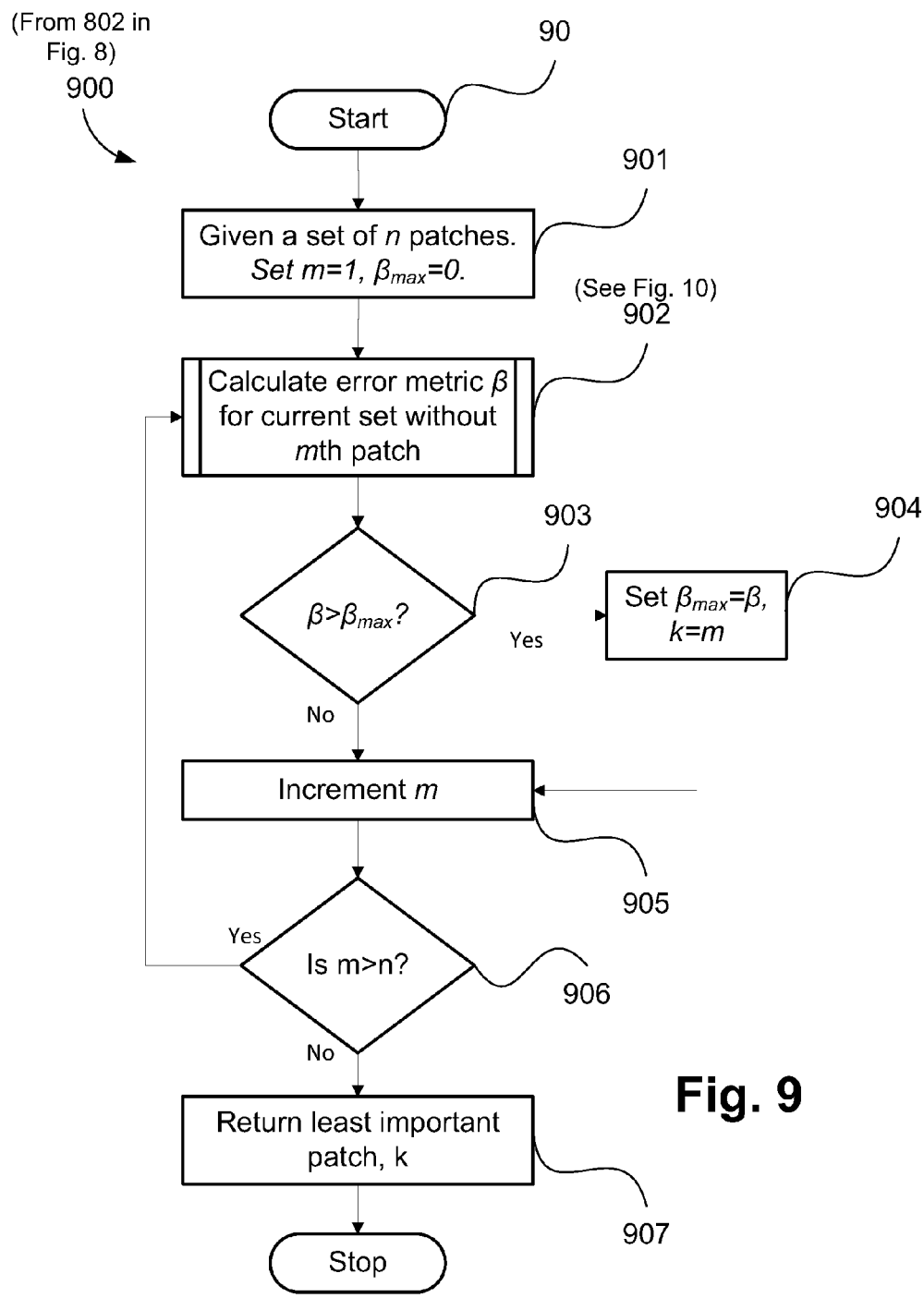
FIG. 9 is a schematic flow diagram illustrating a method of identifying the least important patch in a set of patches as performed in step 802 of FIG. 8.

FIG. 9 shows a process 900 depicting an example of the ranking of subsets of patch locations of the step 802. The least important patch is identified with reference to an error metric β. This error metric β given by Equation [26] represents the maximum variance of the pixel misalignment that is caused by errors in the affine transform estimate. The pixel misalignment is the distance in pixels between the true location of a pixel and the location calculated from the estimated affine transform. The least important patch is that which, when removed from the current set, reduces the value of the error metric by the smallest amount. Starting with a set of n patches, a counter m is set to 1 and the maximum error metric $β_{max}$, is set to zero in a step 901, performed by the processor 605 directed by the software program 633. In a following step 902, performed by the processor 605 directed by the software program 633, the error metric β for the set of patches without the mth patch is calculated and assigned to the variable β, described hereinafter in more detail with reference to FIG. 10. This value of the error metric β is compared to the current maximum value $β_{max}$ in a following step 903, performed by the processor 605 directed by the software program 633. If variable β is greater in value than the maximum error metric $β_{max}$ then the maximum error metric $β_{max}$ is set to the value of β and the current least important patch number, k, is set to the value of m. Next, regardless of the result of the comparison 903, the value of the counter m is incremented in a following step 905, performed by the processor 605 directed by the software program 633. In a following step 906, performed by the processor 605 directed by the software program 633, the value if the counter m is compared to the number of patches. If m is greater than the number of patches the test is complete and a following step 907, performed by the processor 605 directed by the software program 633, returns the least important patch k. Otherwise, the test continues by looping back to the step 902. The variable k now contains the patch number of the least important patch. As previously noted, this number along with the value of the error metric of the set without this patch, which is given by the value of the maximum error metric $β_{max}$, is returned in the step 907.

In summary the specifying a plurality of subsets of candidate alignment patches comprises the steps of determining a rank for each patch in the set of candidate alignment patches, said rank being inversely related to an amount by which removal of said patch from said set reduces a value of a corresponding said error metric β given by Equation [26], and constructing from successively smaller subsets of said ranked patches a corresponding plurality of subsets of candidate alignment patches, said plurality of subsets having correspondingly greater values of corresponding error metrics.

Figure 10:
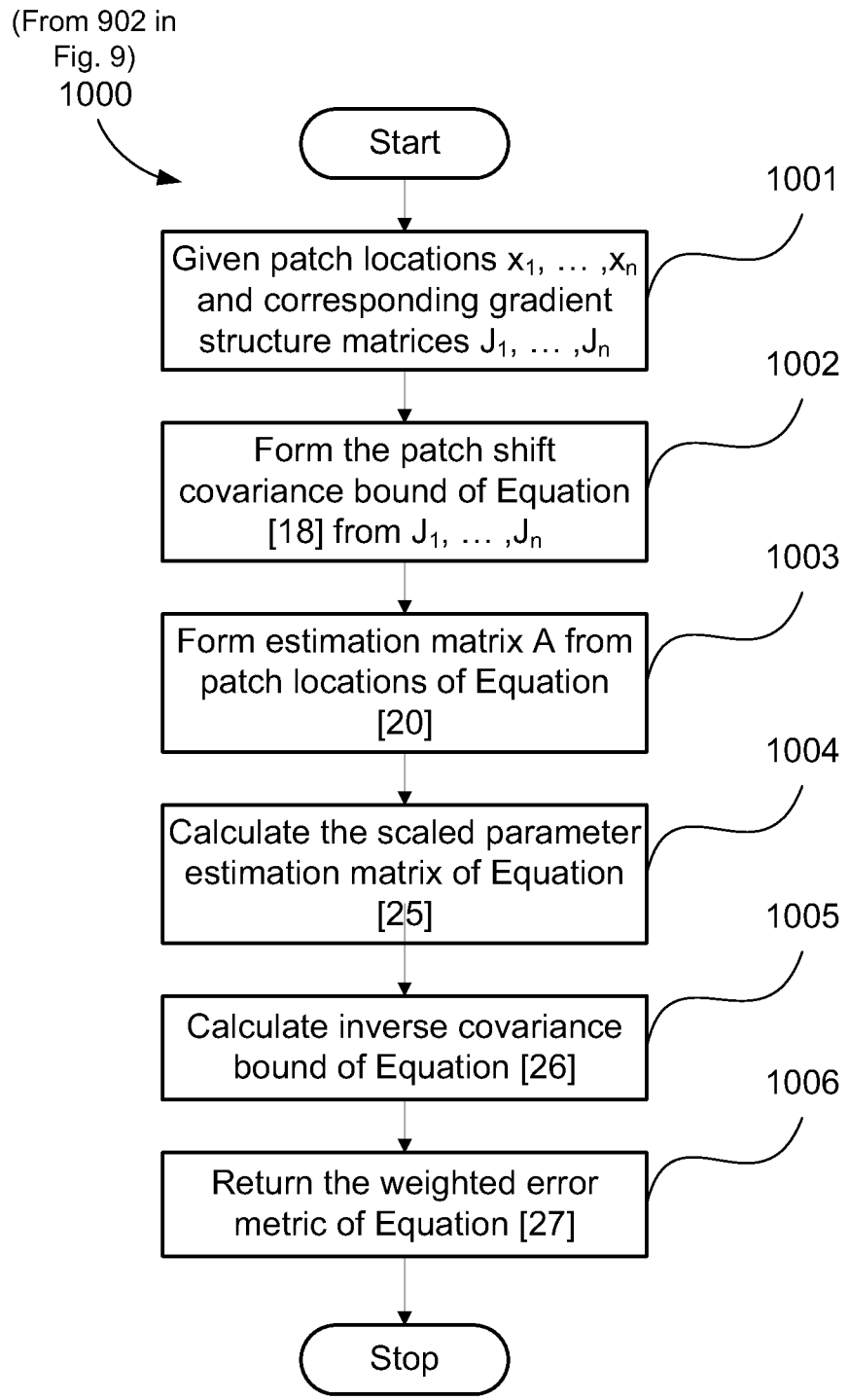
FIG. 10 is a schematic flow diagram illustrating a method of calculating the error metric as performed in step 902 of FIG. 9.

FIG. 10 shows a flowchart 1000, depicting details of the calculation of the error metric β given by Equation [26] of the step 902. The process starts in a step 1001, performed by the processor 605 directed by the software program 633, with the patch locations given by the vectors $x_i$ and the corresponding gradient structure matrices $J_k$ at those patch locations, where the index k ranges from 1 to the number of patch locations n. Each patch location is a two-component vector of the x and y position of the center of the candidate patch $x_k=[x_k, y_k]^T$. The gradient structure matrix $J_k$ is the gradient structure matrix J given by Equation [12] evaluated at the kth patch location, as given by Equation [16] as follows:

$$J_k = J(x_i, y_i). \quad [16]$$

In a following step 1002, performed by the processor 605 directed by the software program 633, the patch shift-covariance matrix C given by Equation [17], for all patches in the current set is calculated. The patch shift-covariance bound C given by Equation [17] is a block diagonal matrix of size 2n×2n whose diagonal entries are the inverse of the gradient structure matrices $J_k$ given by Equation [16] at the candidate patch locations $x_k$ where k ranges from 1 to the number of candidate patch locations n. The patch shift-covariance matrix C in block form is shown in Equation [17] as follows:

$$C(J_1, \ldots, J_n) = \begin{bmatrix} J_1^{-1} & & & \\ & J_2^{-1} & & \\ & & \ddots & \\ & & & J_n^{-1} \end{bmatrix}. \quad [17]$$

where $J_k$ are the gradient structure matrices as given by Equation [16] where k is the patch number from 1 to n, and n is the number of candidate patch locations.

The transform estimation matrix A given by Equation [19] for the affine transform parameter vector p to be estimated between the images is then calculated from the patch locations in step a following 1003, performed by the processor 605 directed by the software program 633. This estimation matrix A given by Equation [19] relates the affine transform parameter vector p to the coordinate offset that would be manifested at the patch location by an affine coordinate transform corresponding to the affine transform parameter vector p. This is a linear matrix equation with the vector of the affine transform parameter vector p, multiplied by the transform estimation matrix A given by Equation [19], to give a vector s of the shifts at each patch location, $s_i$. The shift vectors are the 2 component vectors of the x and y shifts at the patch locations $s_i=[s_x^{(i)}, s_y^{(i)}]^T$. This is given in Equation [18] as follows:

$$A(x_1, \ldots, x_n)p = \begin{bmatrix} s_1 \\ \vdots \\ s_n \end{bmatrix}. \quad [18]$$

where A is the transform estimation matrix, p is the affine coordinate transform parameter vector, $s_k=[s_x^{(k)}, s_y^{(k)}]^T$ are the 2-component vectors of the x and y shifts at the patch locations $x_k=[x_k, y_k]^T$ nominal rectangular overlap area 313.

The affine transformation estimated from the patches could be an affine transform, a reduced affine transform such as rotation, scaling, and translation only, a polynomial transform, or a projective transform. For the particular case of the affine transform, the transform estimation matrix is given by Equation [19] as follows:

$$A(x_1, \ldots, x_n) = \begin{bmatrix} x_1 & y_1 & 0 & 0 & 1 & 0 \\ 0 & 0 & x_1 & y_1 & 0 & 1 \\ \vdots & & & & & \vdots \\ x_n & y_n & 0 & 0 & 1 & 0 \\ 0 & 0 & x_n & y_n & 0 & 1 \end{bmatrix}, \quad [19]$$

where ($x_k$, $y_k$) are the x and y locations of the patches where k is the patch number from 1 to n, and n is the number of candidate patch locations. The affine transform parameter vector p is given by Equation [20] as follows:

$$p = [a\ b\ c\ d\ e\ f]^T, \quad [20]$$

where a, b, c, d, e, and f are the parameters for the affine transform of in Equation [1].

The weighted scaled parameter estimation matrix $A_M$ is calculated in a following step 1004, performed by the processor 605 directed by the software program 633. To calculate this, firstly an estimate of variance of the parameters of the transform is determined. A lower bound on the covariance of the affine transform parameter vector p is given by the inverse of the matrix formed by the multiplication of the transpose of the parameter estimation matrix A given by Equation [19] with the patch shift-covariance matrix C given by Equation [17] and the transform estimation matrix A given by Equation [19]. This is given by Equation [21] as follows:

$$\operatorname{cov}(p) \geq (A^T C^{-1} A)^{-1} \quad [21]$$

where cov(p) is the covariance of the affine transform parameter vector p, A is the transform estimation matrix given by Equation [19], and C is the patch shift-covariance matrix given by Equation [17].

The metric of importance in aligning the images accurately is the maximum coordinate misalignment shift between the true position of a pixel and the estimated position of the pixel at the corners of the overlap area. The variance of the maximum coordinate misalignment shift due to the errors in the estimated affine coordinate transforms can be calculated by multiplying the affine transform parameter vector p by an appropriate matrix. For affine transforms the parameter weighting matrix M is given by Equation [22] as follows:

$$M = \begin{bmatrix} L_x^{(1)} & L_y^{(1)} & 0 & 0 & 1 & 0 \\ 0 & 0 & L_x^{(1)} & L_y^{(1)} & 0 & 1 \\ \vdots & & & & & \vdots \\ L_x^{(v)} & L_y^{(v)} & 0 & 0 & 1 & 0 \\ 0 & 0 & L_x^{(v)} & L_y^{(v)} & 0 & 1 \end{bmatrix}, \quad [22]$$

where ($L_x^{(k)}$, $L_y^{(k)}$) are the coordinates of the corners of a convex bounding area, k is the corner number between 1 and v, and v is the number of corners. Typically this is the nominal rectangular overlap area 313 and v is four.

Alternatively the affine parameters can be scaled so that they become the variance of the maximal pixel offset in the image that is due to a single parameter. In this case the parameter weighting matrix M would be a diagonal matrix with weighting factors ($L_x$, $L_y$, $L_x$, $L_y$, 1, 1) on the diagonal where $L_x$ and $L_y$ are characteristic lengths in the x and y axes, where typically these characteristic lengths would be half of the image size. This is given in Equation [23] as follows:

$$M = \begin{bmatrix} L_x & & & & & \\ & L_y & & & & \\ & & L_x & & & \\ & & & L_y & & \\ & & & & 1 & \\ & & & & & 1 \end{bmatrix} \quad [23]$$

where $L_x$ and $L_y$ are characteristic lengths in the x and y axes, where typically these characteristic lengths would be half of the dimensions of the nominal rectangular overlap area 313.

In the step 1004 the parameter estimation matrix A given by Equation [19] is now multiplied on the right by the inverse of the parameter scaling matrix M given by Equation [23] to give a scaled parameter estimation matrix $A_M$ as given by Equation [24] as follows:

$$A_m(x_1, \ldots, x_n) = A(x_1, \ldots, x_n) M^{-1}. \quad [24]$$

where M is the parameter scaling matrix of Equation [23], A is the parameter estimation matrix of Equation [19], $x_k=[x_k, y_k]^T$ are the patch locations where k is the patch number from 1 to n, and n is the number of candidate patch locations.

In a following step 1005, performed by the processor 605 directed by the software program 633, the transpose of the scaled parameter estimation matrix $A_m$ is now multiplied by the inverse of the patch shift-covariance matrix C given by Equation [17] and multiplied by the scaled parameter estimation matrix $A_m$. This gives the inverse covariance matrix $D_p$ as shown in Equation [25] as follows:

$$D_p(x_1, \ldots, x_n) = A_M^T(x_1, \ldots, x_n) C^{-1}(J_1, \ldots, J_n) A_m(x_1, \ldots, x_n) \quad [25]$$

where $A_M$ is the scaled parameter estimation matrix of Equation [24], C is the patch shift-covariance matrix of Equation [17], $J_k$ are the gradient structure matrices as given by Equation [16], $x_k=[x_k, y_k]^T$ are the patch locations where k is the patch number from 1 to n, and n is the number of candidate patch locations.

The error metric β given by Equation [26] is now calculated in a following step 1006, performed by the processor 605 directed by the software program 633. The error metric β is the inverse of the minimum eigenvalue of the inverse covariance bound $D_p$ given by Equation [25]. This minimum eigenvalue of the inverse covariance bound $D_p$ is equivalent to the maximum eigenvalue of the covariance bound $D_p^{-1}$. The transform estimation matrix A given by Equation [19] depends upon the location of the patches and the patch shift-covariance matrix C given by Equation [17] depends upon the gradient structure matrices $J_k$ given by Equation [16] at the patch locations $x_k$. This is given in Equation [26] as follows:

$$\beta(x_1, \ldots, x_n) = (\text{eigmin}[D_p(x_1, \ldots, x_n)])^{-1}. \qquad [26]$$

where β is the error metric, $D_p$ is the inverse covariance matrix of Equation [25], eigmin represents the operation of calculating the minimum eigenvalue, and $x_k = [x_k, y_k]^T$ are the patch locations where k is the patch number from 1 to n, and n is the number of candidate patch locations.

Alternatively, other error metrics can be used to calculate the size of the covariance bound $D_p$ such as the trace of this matrix, which corresponds to the Frobenius norm. The effectiveness of the EBPS method is not changed significantly by the exact error metric chosen.

This error metric β given by Equation [26] will decrease monotonically as the number of patches is increased, and this characteristic can be used to select a good subset of patches in the step 505 to be used to align the images. In particular, as the strongest patches are at the start of the ranked list, a graph of the error metric β given by Equation [26] evaluated over the set of patches in the ranked patch set list will look like that given in FIG. 12. The error metric β given by Equation [26] can be seen to decrease quickly at first, and then to decrease more slowly as the set number increases. In particular a predetermined criterion can be established such that when the values of the error metric β given by Equation [26] fulfil this predetermined criterion the set associated with a value of the error metric will be selected as the good subset of patches.

Figure 11:
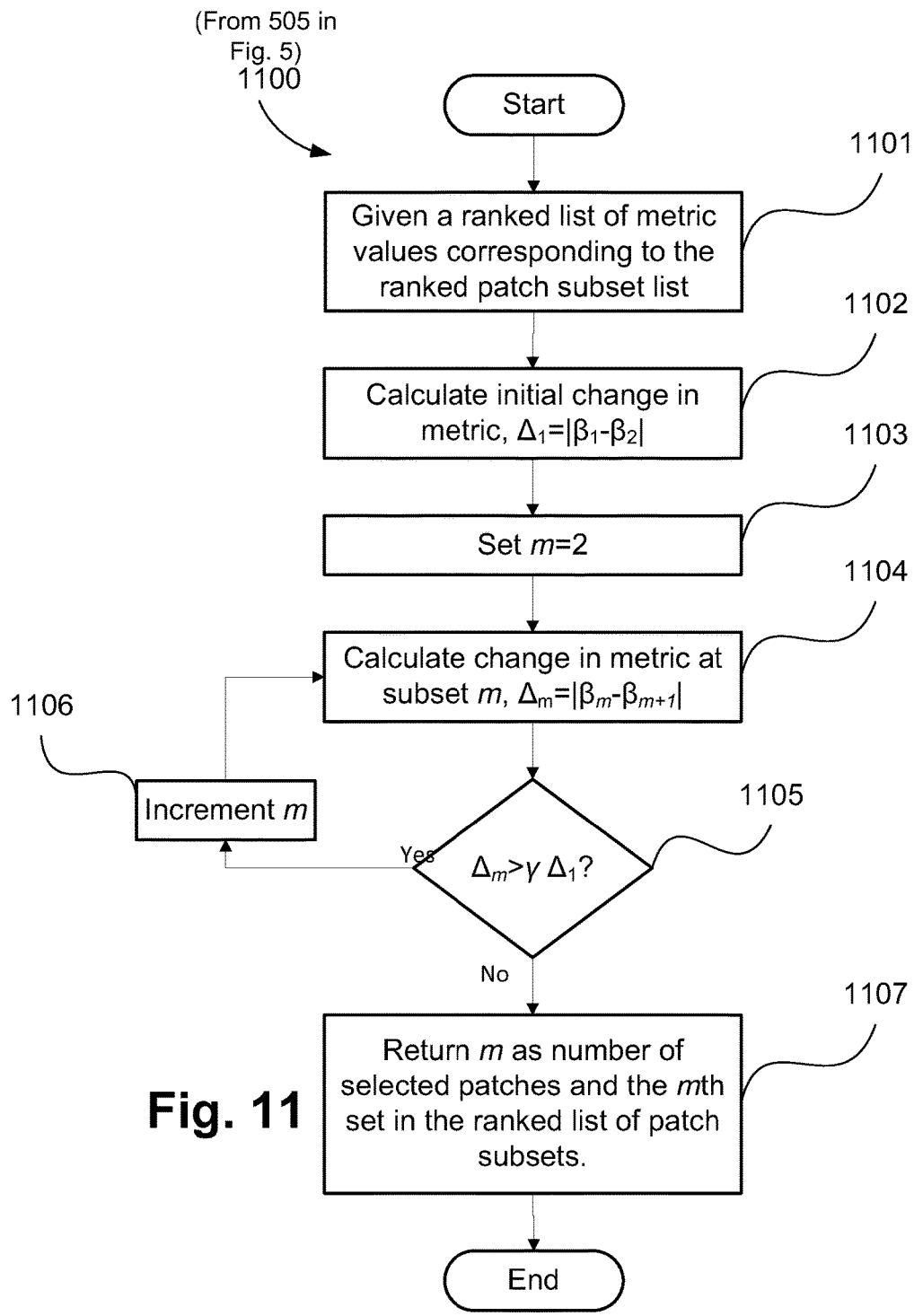
FIG. 11 is a schematic flow diagram illustrating a method of selecting a good subset of patches as performed in step 505 of FIG. 5.

A process 1100 that describes a predetermined criterion to select a good subset of patches is shown in FIG. 11 with reference to the ranked list of patches produced in the step 504. The input to the process 1100 in a step 1101 is a list of ranked metric values $\beta_k$ that correspond to the error metric β given by Equation [26] evaluated for the set of patches in the corresponding subset in the ranked list of patches calculated in the step 504. This list of metric values is indexed by k which represents the kth subset in the ranked list of subsets. In a following step 1102, performed by the processor 605 directed by the software program 633, the initial change between the error metric value $\beta_1$, evaluated over the smallest set of patches and the error metric value $\beta_2$, evaluated over the next largest set of patches is calculated as $\Delta_1 = |\beta_1 - \beta_2|$. In a following step 1103, performed by the processor 605 directed by the software program 633, the counter m is set to 2 and in a following step 1104, performed by the processor 605 directed by the software program 633, the magnitude of the change between the error metric value $\beta_m$ for the current mth ranked subset and the error metric value $\beta_{m+1}$ of the succeeding (m+1)th ranked subset is calculated as $\Delta_m = |\beta_m - \beta_{m+1}|$. As long as the change in the error metric β between the current mth ranked subset and the succeeding (m+1)th ranked subset is greater than a certain fraction γ of the initial change, the counter m is incremented in a step 1106, performed by the processor 605 directed by the software program 633 and the process repeated. Typically γ has a value of 1/10. Otherwise, if the change in the error metric β between the current mth ranked subset and the succeeding (m+1)th ranked subset is not greater than a certain fraction γ of the initial change, the number of selected patches being the value of the counter m and the good subset of patches being the current mth ranked subset are returned in step 1107, performed by the processor 605 directed by the software program 633 and the process ends.

Figure 12:
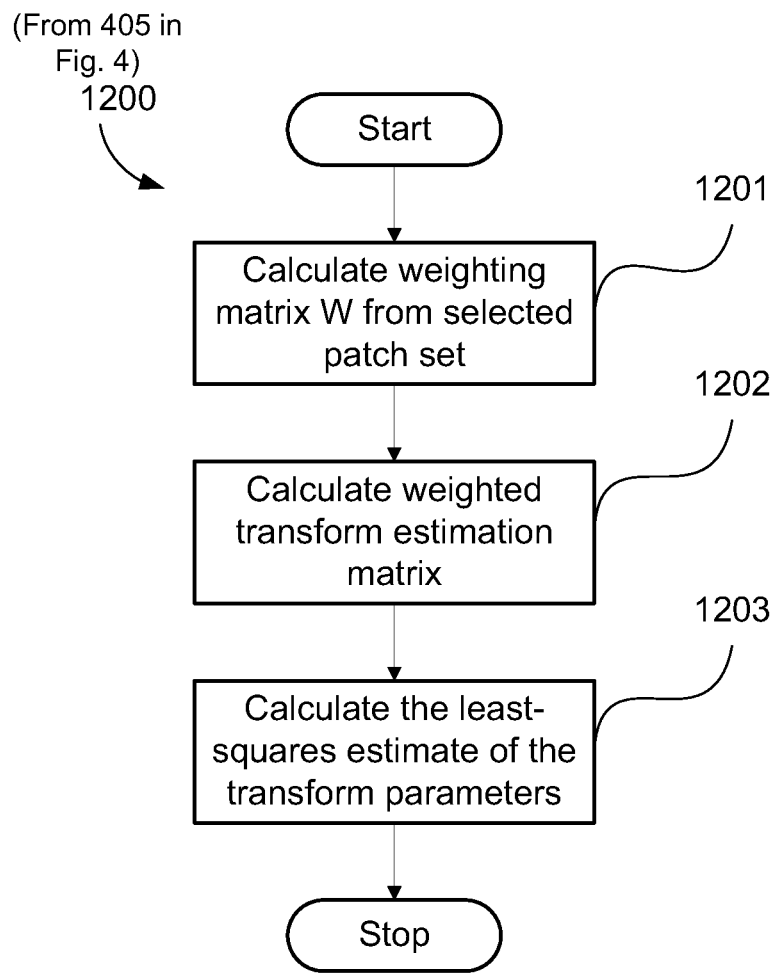
FIG. 12 is a schematic flow diagram illustrating a method of calculating the weightings as performed in step 406 of FIG. 4.

The estimate of affine transform parameter vector p is calculated using a least-squares fit to the measured shifts $s_k$ at the selected patch locations $x_k$ in the step 405. This process is shown in FIG. 12 which depicts a process 1200. In a step 1201, performed by the processor 605 directed by the software program 633, the patch shift-covariance matrix C given by Equation [17] is calculated from the gradient structure matrices $J_k$ given by Equation [16] at the selected patch locations $x_k$. The transform estimation weighting matrix W given by Equation [27] reorients the measured shifts so that the axes are in the eigen-directions of the patch shift-covariance matrix C given by Equation [17] evaluated at the selected patch locations $x_k$, and weights the directions independently according to the variance of the shift estimates in that direction. The transform estimation weighting matrix is a block diagonal matrix with the patch weighting matrices $Y_k$ on the diagonal. The transform estimation weighting matrix W is given by Equation [27] as follows:

$$W = \begin{bmatrix} Y_1 & & & \\ & Y_2 & & \\ & & \ddots & \\ & & & Y_n \end{bmatrix}. \qquad [27]$$

where $Y_k$ are the patch weighting matrices for the selected patches where k is the patch number in the range 1 to n.

The patch weighting matrices $Y_k$ used in Equation [28] rotate the frame of reference for the measured shifts by an angle θ. After the rotation of the shift axes, the shifts are anisotropically weighted in the rotated directions by two directional weighting coefficients, $w_1$ and $w_2$. This gives the patch weighting matrix $Y_k$ in Equation [28] as follows:

$$Y_k = \begin{bmatrix} w_1 & \\ & w_2 \end{bmatrix} U_k. \qquad [28]$$

where $w_1$ and $w_2$ are directional weighting coefficients and $U_k$ is a rotation matrix that rotates the axes by an angle $\theta_k$, as given by Equation [29] as follows:

$$U_k = \begin{bmatrix} \cos\theta_k & -\sin\theta_k \\ \sin\theta_k & \cos\theta_k \end{bmatrix}. \qquad [29]$$

where $\theta_k$ is the angle that corresponds to the angle of the rotated frame of reference for the kth patch where k is the patch number in the range 1 to n.

The rotation angle $\theta_k$ is determined by the predominant angle of the texture in the kth patch. This can be calculated from a spectral factorization of the gradient structure matrix $J_k$ associated with the kth patch, In particular, the 2×2 gradient structure matrix $J_k$ can be factorized into the product of a rotation matrix, a diagonal matrix, and the transpose of the rotation matrix, as given by Equation [30] as follows:

$$J_k = U_k \begin{bmatrix} \lambda_1 & \\ & \lambda_2 \end{bmatrix} U_k^T, \qquad [30]$$

where $U_k$ is the rotation matrix in Equation [28], and the $\lambda_1$ and $\lambda_2$ are the eigenvalues of the gradient structure matrix $J_k$. This is the Schur factorization and gives an appropriate rotation to use for the transform estimation weighting matrix W given by Equation [27]. The directional weighting coefficients $w_1$ and $w_2$ are given by the square roots of the eigenvalues, $w_1 = \sqrt{\lambda_1}$ and $w_2 = \sqrt{\lambda_2}$; however, other functional forms of the eigenvalues can also be used, in particular an exponential reweighting of the eigenvalues to lower the weight of spurious texture due to noise in the image can be useful. Alternatively, the patch weighting matrix $Y_k$ used in Equation [28] can also be calculated using a Cholesky factorization of the gradient structure matrix $J_k$ for the selected patches.

The affine transform parameter vector estimate $\hat{p}$ is now calculated using the shifts estimated from the patches 1 to m, where m is the selected number of patches, and the weighting matrix. The affine transform parameter vector estimate $\hat{p}$ is calculated by the solving the linear weighed least-squares problem for the transform parameters given in normal form by Equation [31] as follows:

$$(WA)^T WA \hat{p} = (WA)^T W \begin{bmatrix} s_1 \\ \vdots \\ s_m \end{bmatrix}. \qquad [31]$$

where W is the transform estimation weighting matrix of in Equation [28], M is the parameter scaling matrix of Equation [23], A is the parameter estimation matrix of Equation [19], and $S_k = [s_x^{(k)}, s_y^{(k)}]^T$ are the 2-component vectors of the x and y shifts at the patch locations $x_k = [x_k, y_k]^T$.

The least squares solution can be calculated using a standard linear solver, or by computation of the singular value decomposition of the weighted parameter estimation matrix, WA.

EBPS Arrangement 2

In the main EBPS arrangement only the shifts between the patches are calculated. An alternative EBPS arrangement is to use not only the shifts but also other measurements between the pixels of the images. For example, the x and y scaling between the images could be used. In this case the entirety of the EBPS arrangement no. 1 is used with the following exceptions: The gradient structure matrix $J_k$ of Equation [12] is replaced by a matrix that includes a measure of the ability to estimate the scaling from the image texture. In particular, consider the relationship between the two patches $I_2(x, y) = I_1(x, y; \alpha_1, \ldots, \alpha_j), g(x, y; \alpha_1, \ldots, \alpha_j))$ where $I_1(x, y)$ is the intensity function the first patch and $I_2(x, y)$ is the intensity function for the second patch, and f(x, y) and g(x, y) are general functions. To measure the general parameters $\alpha_1, \ldots, \alpha_j$ an appropriate tensor to replace Equation [12] is given by Equation [32] as follows:

$$J(x, y) = \sum_{i,j} w(i, j) Z \begin{bmatrix} I_x^2(x+i, y+j) & I_x(x+i, y+j) I_y(x+i, y+j) \\ I_x(x+i, y+j) I_y(x+i, y+j) & I_y^2(x+i, y+j) \end{bmatrix} Z^T. \qquad [32]$$

where the summation occurs over indices i and j which range from negative half the patch size to positive half the patch size in x and y respectively, I(x, y) is the image pixel value at the coordinate (x, y), $I_x(x, y)$ is the gradient of the image pixel values in the x direction at the coordinate (x, y), $I_y(x, y)$ is the gradient of the image pixel values in the y direction at the coordinate (x, y), w(x, y) is a weighting function such as a 2D Tukey windowing function given by Equation [13]; however, many other windowing functions can be used, and where the matrix Z is the derivative matrix of the functions f and g with respect the parameters $\alpha_1, \ldots, \alpha_j$ as given by Equation [33] as follows:

$$Z = \begin{bmatrix} \frac{df}{d\alpha_1} & \frac{dg}{d\alpha_1} \\ \vdots & \vdots \\ \frac{df}{d\alpha_j} & \frac{dg}{d\alpha_j} \end{bmatrix}. \qquad [33]$$

where functions f and g are the functions describing the general coordinate transform for x and y respectively with respect the general coordinate transform parameters $\alpha_1, \ldots, \alpha_j$. In addition, the parameter estimation matrix given by Equation [5] is modified to use the measurements of the parameters $\alpha_1, \ldots, \alpha_j$ to estimate the overall transform parameters.

EBPS Arrangement 3

In the main EBPS arrangement a set of patches locations is found which is optimal when all patches are used to estimate a coordinate transform. This is the preferred EBPS arrangement when the errors are known to be Gaussian distributed. However, it is often the case that the patch shift estimates have outliers which do not fit a Gaussian distribution. In the presence of outliers, a robustification step such as RANSAC (RANdom SAmple Consensus) is performed.

This step identifies any outliers and removes them from the set of patch shifts that are used to estimate the affine transform. An alternative EBPS arrangement is to choose the optimal set of m patches C such that the maximum of the error metric $\beta$ of Equation [26] over all subsets of C of length m−1 is minimized. In this case the entirety of the EBPS arrangement no. 1 would be the same except that the transform estimation step 1203 would incorporate such a robustification step and the patch ranking step 504 would find each set of length m which minimizes the maximum of the error metric of Equation [26] evaluated on all the subsets that can be formed by removing one patch.

Alternative Applications

In addition to the application of generating a stitched composite image from a set of microscope images captured on a grid, the EBPS arrangements described herein may be applied to alternative image processing tasks. Within the field of microscopy this may relate to alternative microscope modalities and/or alternative geometrical layouts of image capture. In microscopy or in other domains, the EBPS arrangements may be used within a system for recognition (e.g. as part of a computer aided diagnosis system), calibration, the generation of a panorama, photomontage, high dynamic range imaging, multi-modal registration, etc.

Additionally, the images to be processed may be obtained using alternative devices such as camera, video camera, mobile phone, scanner, tablet or any other device with a camera attached to it. The images may be captured on a single device or multiple devices, for example a set of networked cameras or phones. Some images may be based on a known truth image rather than a captured image—for example they may represent a test pattern that is to be aligned to a captured image, perhaps for the purpose of calibration. Additionally, the EBPS arrangements may involve the registration of the entire image, or a substantial part of the image rather than the narrow edge regions of images that are considered in the microscope stitching method described. Finally, the images may be registered in sets rather than pairwise depending on the precise applications.

The advantage of the EBPS arrangements described is expected to be greatest in specific cases similar to the microscope slide stitching example—that is to say where the tolerances of the system are tightly bounded, in particular in relation to offsets and rotations, and the subject matter is fixed spatially.

Example(s)/User Case(s)

Figure 13A:
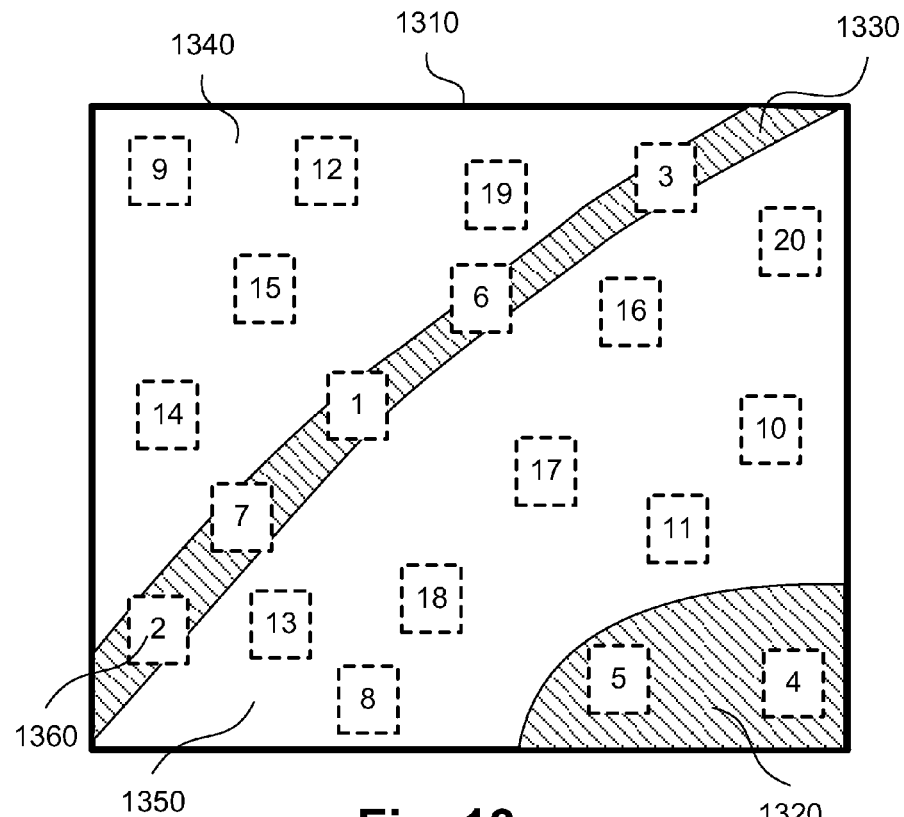
FIG. 13a is an illustration of the method of FIG. 4 on an example image.

FIG. 13a illustrates the process 500 of selecting patches from within an image. The image is represented by the rectangular region 1310 and consists of two highly textured regions 1320 and 1330 and two regions of low texture 1350 and 1360. A set of candidate patch locations is located by the step 503 based on the gradient structure matrix $J_k$ generated at the step 502. These candidate patches are indicated by the dashed rectangles such as 1360. The step 504 ranks the subsets of the patches, assigning an error metric β to each subset. The numbers in each dashed rectangular candidate patch represent the order in which patches are assigned to sets. For example, the first set contains the patches labelled 1, 2, and 3; the second set contains the patches 1, 2, 3, and 4; and so on adding the next patch label until all 20 patches are included in set number 18.

Figure 13B:
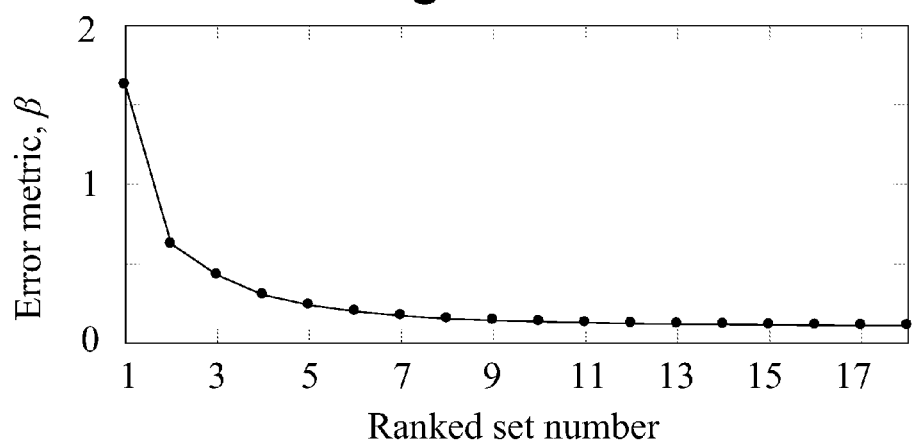

The error metric values $β_k$ for each ranked set is illustrated in FIG. 13b which is a plot of the value of the error metric β as a function of the ranked set number. A good subset of patches can now be selected according to the step 505. For the example shown, a good set of patches to select may be set 3, which has been chosen as the change between set 4 and set 3 is less than the fraction γ of the initial change where we have taken γ=0.1. This good set of patches to select includes the patches labelled 1 to 5. These patches are reasonably well distributed across the image and predominantly cover highly textured regions. Alternative methods for selecting patches based on heuristics might select a suboptimal set of patches. For example, if the heuristic strongly favours the patch sets that are well separated it may select patch 9 rather than patch 1. It is also apparent that the selected set of patches that meet the predetermined criterion will also be the smallest subset of patches that meets the criterion.

Figure 15A:
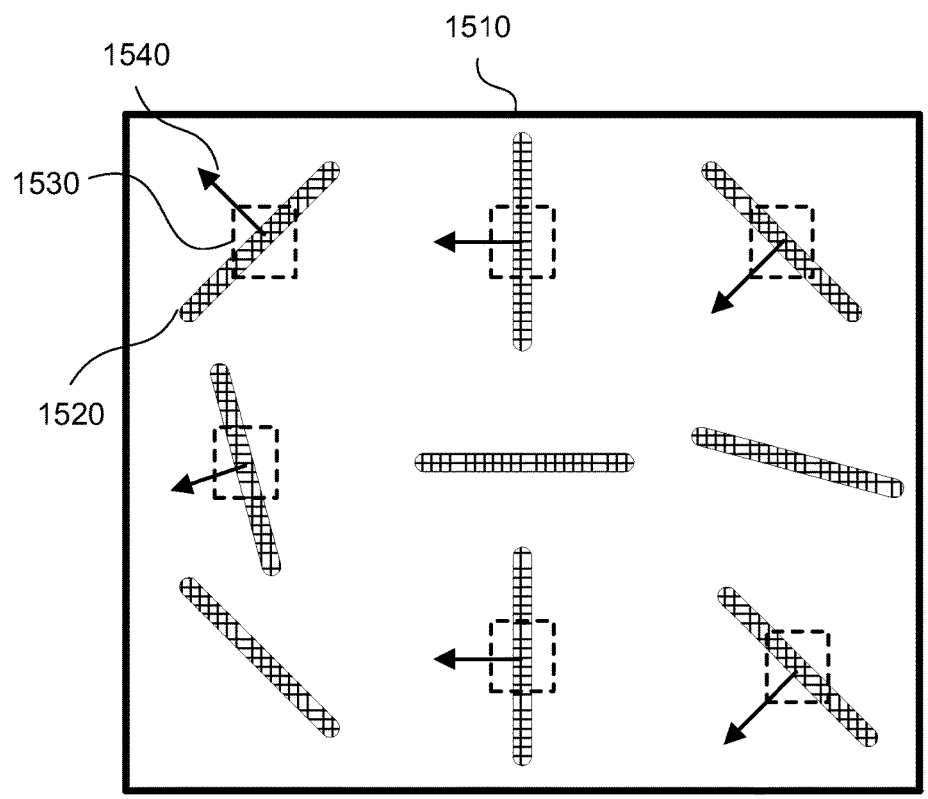
FIG. 15a is an illustration of a test image containing line features and the selected patches and direction of the weightings as calculated by the method of FIG. 4.

FIG. 15 depicts a result from the step 1200 which estimates an affine transform using a least-squares fit to the measured shifts at the selected patch locations. A set of patches has been selected based on an image represented by 1510. The image consists of 9 line-like features on an otherwise untextured background. The features are represented by hashed elongated round rectangles such as 1520. There are 6 selected patches represented by dashed rectangles such as 1530. The shift estimate is accurate in the direction orthogonal to the line feature, as shown by an arrow 1540 for the feature 1520. The shift estimate is inaccurate in the direction along the line feature. The step 1201 calculates a transform estimation weighting matrix W given by Equation [27] that stores the expected directional accuracy of shift estimates at all of the patches that can be used to form a global transform estimate based on the shift estimates at the patches at the steps 1202 and 1203.

Figure 15B:
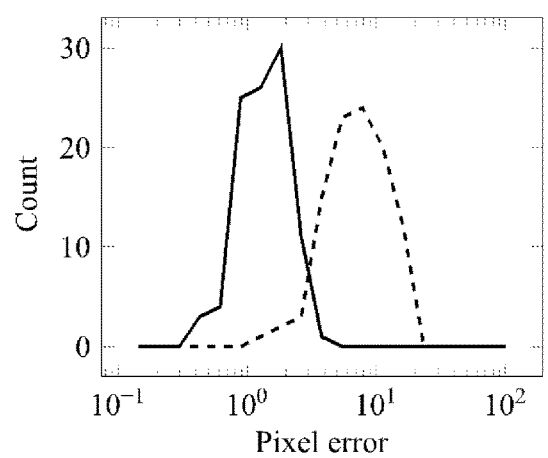

The selection of which line features will be good to use in an estimate of the global affine transform is non-trivial. For example, taking only horizontal lines clearly gives no information about deformations in x; similarly taking lines all radiating from a single point gives no information about the magnification about that point. However, the error metric β of Equation [26] will show this effect and give a high error in both cases. Minimising the error metric β will select the appropriate line and/or corner features that minimise the variance of the overall affine transform. In the example illustrated in FIG. 15a, an affine transform can be calculated using the shift measurements at the selected patches shown as dashed rectangles and using the weighting calculated at the step 1201. This affine transform estimate is an order of magnitude more accurate compared to an arbitrary selection of the patches and using an unweighted least-squares estimate, as shown in FIG. 15b.

INDUSTRIAL APPLICABILITY

The arrangements described are applicable to the computer and data processing industries and particularly for the virtual microscopy industry.

The foregoing describes only some embodiments of the present invention, and modifications and/or changes can be made thereto without departing from the scope and spirit of the invention, the embodiments being illustrative and not restrictive.

The invention claimed is:
1. A method of determining a global coordinate transform between a first image and a second image from a selected subset of candidate alignment patches, said method comprising the steps of:
  determining a rate of change of pixel values for each of a plurality of locations on the first image;
  identifying a set of candidate alignment patches in the first image based upon the determined rate of change;
  specifying a plurality of subsets of candidate alignment patches from the set of candidate alignment patches, each specified subset containing at least three patches, based on a global error metric corresponding to each subset, said global error metric depending upon errors of the global transform over an overlap area of the first image and the second image, and upon said rate of change of pixel values for the patches in a corresponding subset;
  selecting a subset of candidate alignment patches from said plurality of subsets of candidate alignment patches based upon a predetermined criterion which is dependent upon the selected subset;
  estimating, for each patch in the selected subset, a shift between the patch and a corresponding patch in the second image, the location of the corresponding patch in the second image being determined from the location of the patch in the first image; and
  determining the global coordinate transform between the first image and second image based on the estimated shifts.

2. A method according to claim 1, wherein said estimated shifts are weighted in accordance with the rate of change of pixel values determined for all of the patches in the selected subset.

3. A method according to claim 2, wherein the weighting down-weights estimates of shifts between a patch in the selected subset and a corresponding patch in the second image with a high variance.

4. A method according to claim 1, wherein the step of identifying the set of candidate alignment patches comprises the steps of:
   determining a gradient structure tensor dependent upon said rate of change of pixel values;
   determining a shift covariance bound of the gradient structure tensor; and
   defining locations of the candidate alignment patches at local minima of the shift covariance bound.

5. A method according to claim 1, wherein the error metric reflects the maximum variance of pixel misalignment at corners of an overlap area of the first image and the second image caused by errors in the coordinate transform.

6. A method according to claim 1, wherein the specifying a plurality of subsets of candidate alignment patches comprises the steps of:
   identifying a least important patch in the set of candidate alignment patches which, when removed from set, reduces a corresponding error metric by a smallest amount;
   repeating the identifying step to thereby determine a rank for each patch in the set of candidate alignment patches, said rank being inversely related to the amount by which removal of said patch from said set reduces a value of the corresponding said error metric; and
   constructing from successively smaller subsets of said ranked patches a corresponding plurality of subsets of candidate alignment patches, said plurality of subsets having correspondingly greater values of corresponding error metrics.

7. A method according to claim 1, wherein the step of selecting a subset of candidate alignment patches comprises selecting the smallest subset that meets the predetermined criterion.

8. A method according to claim 1, wherein the step of estimating a shift between the patch and the corresponding patch in the second image utilises a shift covariance matrix.

9. A method according to claim 1, wherein the coordinate transform is a low-order polynomial transform.

10. A method according to claim 1, wherein the coordinate transform is a projective transform.

11. A method of forming a composite image from a first image and a second image captured by a microscope, said first and second images having an area of overlap, said method comprising the steps of:
   determining a rate of change of pixel values for each of a plurality of locations on the first image;
   identifying a set of candidate alignment patches in the first image based upon the determined rate of change;
   specifying a plurality of subsets of candidate alignment patches from the set of candidate alignment patches, each specified subset containing at least three patches, based on a global error metric corresponding to each subset, said error metric depending upon said rate of change of pixel values for the patches in a corresponding subset;
   selecting a subset of candidate alignment patches from said plurality of subsets of candidate alignment patches based upon a predetermined criterion which is dependent upon the selected subset;
   estimating, for each patch in the selected subset, a shift between the patch and a corresponding patch in the second image, the location of the corresponding patch in the second image being determined from the location of the patch in the first image;
   determining a global coordinate transform between the first image and second image based on the estimated shifts; and
   combining the first image and the second image using the global coordinate transform to form the single composite image.

12. A method of determining a global coordinate transform between a first image and a second image from a selected subset of candidate alignment patches, said method comprising the steps of:
   determining a rate of change of pixel values for each of a plurality of locations on the first image;
   identifying a set of candidate alignment patches in the first image based upon the determined rate of change;
   specifying a plurality of subsets of candidate alignment patches from the set of candidate alignment patches, each specified subset containing at least three patches, based on a global error metric corresponding to each subset, said global error metric depending upon errors of the global transform over an overlap area of the first image and the second image, and upon said rate of change of pixel values for the patches in a corresponding subset;
   selecting, from said plurality of subsets of candidate alignment patches based upon a predetermined criterion which is dependent upon the selected subset, a subset of candidate alignment patches that minimises a maximum error in the coordinate transform;
   estimating, for each patch in the selected subset, a shift between the patch and a corresponding patch in the second image, the location of the corresponding patch in the second image being determined from the location of the patch in the first image; and
   determining the global coordinate transform between the first image and second image based on the estimated shifts.

13. An apparatus for determining a global coordinate transform between a first image and a second image from a selected subset of candidate alignment patches, said apparatus comprising:
   a processor; and
   a memory storing a computer executable software program for directing the processor to perform the steps of:
   determining a rate of change of pixel values for each of a plurality of locations on the first image;
   identifying a set of candidate alignment patches in the first image based upon the determined rate of change;
   specifying a plurality of subsets of candidate alignment patches from the set of candidate alignment patches, each specified subset containing at least three patches, based on a global error metric corresponding to each subset, said global error metric depending upon errors of the global transform over an overlap area of the first image and the second image, and upon said rate of change of pixel values for the patches in a corresponding subset;
   selecting a subset of candidate alignment patches from said plurality of subsets of candidate alignment patches based upon a predetermined criterion which is dependent upon the selected subset;

estimating, for each patch in the selected subset, a shift between the patch and a corresponding patch in the second image, the location of the corresponding patch in the second image being determined from the location of the patch in the first image; and determining the global coordinate transform between the first image and second image based on the estimated shifts.

14. A non-transitory computer readable storage medium having a computer program recorded therein, the program being executable by a computer apparatus to make the computer perform a method for determining a global coordinate transform between a first image and a second image from a selected subset of candidate alignment patches, said program comprising:

computer executable code for determining a rate of change of pixel values for each of a plurality of locations on the first image;

computer executable code for identifying a set of candidate alignment patches in the first image based upon the determined rate of change;

computer executable code for specifying a plurality of subsets of candidate alignment patches, each specified subset containing at least three patches, from the set of candidate alignment patches based on a global error metric corresponding to each subset, said global error metric depending upon errors of the global transform over an overlap area of the first image and the second image, and upon said rate of change of pixel values for the patches in a corresponding subset;

computer executable code for selecting a subset of candidate alignment patches from said plurality of subsets of candidate alignment patches based upon a predetermined criterion which is dependent upon the selected subset;

computer executable code for estimating, for each patch in the selected subset, a shift between the patch and a corresponding patch in the second image, the location of the corresponding patch in the second image being determined from the location of the patch in the first image; and computer executable code for determining the global coordinate transform between the first image and second image based on the estimated shifts.

* * * * *